United States Patent
Sato et al.

(10) Patent No.: US 7,849,278 B2
(45) Date of Patent: *Dec. 7, 2010

(54) LOGICAL PARTITION CONVERSION FOR MIGRATION BETWEEN STORAGE UNITS

(75) Inventors: Eiichi Sato, Hiratsuka (JP); Masafumi Nozawa, Odawara (JP); Kyosuke Achiwa, Odawara (JP)

(73) Assignee: Hitachi, Ltd, Tokyo (JP)

( * ) Notice: Subject to any disclaimer, the term of this patent is extended or adjusted under 35 U.S.C. 154(b) by 397 days.

This patent is subject to a terminal disclaimer.

(21) Appl. No.: 11/875,129

(22) Filed: Oct. 19, 2007

(65) Prior Publication Data

US 2008/0046671 A1    Feb. 21, 2008

Related U.S. Application Data

(63) Continuation of application No. 11/694,095, filed on Mar. 30, 2007, now Pat. No. 7,305,533, which is a continuation of application No. 11/017,967, filed on Dec. 22, 2004, now Pat. No. 7,213,115.

(30) Foreign Application Priority Data

Nov. 1, 2004    (JP) .............................. 2004-318082

(51) Int. Cl.
    G06F 13/00    (2006.01)
(52) U.S. Cl. ......................... 711/161; 711/173; 709/246
(58) Field of Classification Search ................. 711/161, 711/173; 709/246
    See application file for complete search history.

(56) References Cited

U.S. PATENT DOCUMENTS

| 6,347,358 B1 | 2/2002 | Kuwata |
| 6,640,291 B2 | 10/2003 | Fujibayashi et al. |
| 6,845,425 B2 | 1/2005 | Fought et al. |
| 6,920,555 B1 | 7/2005 | Peters et al. |
| 6,950,915 B2 | 9/2005 | Ohno et al. |

(Continued)

FOREIGN PATENT DOCUMENTS

JP    11-296305    10/1999

(Continued)

OTHER PUBLICATIONS

Japanese Patent Office; office action issued May 6, 2010; pp. 1-2.

*Primary Examiner*—Jared I Rutz
(74) *Attorney, Agent, or Firm*—Foley & Lardner, LLP

(57) ABSTRACT

A technique that can efficiently achieve migration of a configuration and data between storage units with varying constructions of configuration information and that can alleviate burdens of personal operation by an administrator, etc. With the configuration information of each storage unit controlled by the storage control server, based on each piece of configuration information, the transfer-source configuration information is converted into information necessary for establishing the logical partition configuration of a storage unit which has the transfer-destination logical partition function. The information prepared by the conversion is transmitted to the transfer-destination storage unit and the configuration with the transfer-source logical configuration set as the transfer-destination logical partition is updated in the transfer-destination storage unit. After the migration of the configuration, the data is migrated using a remote copy function of carrying out data copy between the transfer-source and transfer-destination logical devices.

12 Claims, 18 Drawing Sheets

U.S. PATENT DOCUMENTS

| | | |
|---|---|---|
| 6,976,103 B1 | 12/2005 | Watanabe et al. |
| 7,305,462 B2 | 12/2007 | Nakamura et al. |
| 2002/0004890 A1 | 1/2002 | Ofek et al. |
| 2003/0065898 A1 | 4/2003 | Flamma et al. |
| 2004/0044851 A1 | 3/2004 | Dawson et al. |
| 2004/0049553 A1 | 3/2004 | Iwamura et al. |
| 2005/0015546 A1 | 1/2005 | Zohar et al. |
| 2008/0065850 A1 | 3/2008 | Nakamura et al. |

FOREIGN PATENT DOCUMENTS

| | | |
|---|---|---|
| JP | 2000-187617 | 7/2000 |
| JP | 2001-249853 | 9/2001 |
| JP | 2004-102374 | 9/2002 |
| JP | 2003-108420 | 4/2003 |
| JP | 2003-186630 | 7/2003 |
| JP | 2004-013367 | 1/2004 |

< Storage Unit Control Table >                                    120

| Control No. | Storage Unit ID | Storage Unit Name | Control Table Address | Presence or Absence Of Logical Partition function |
|---|---|---|---|---|
| 1 | 00100A | Online-Storage1 | F000 | Not Present |
| 2 | 00100B | Backup-Storage1 | F100 | Not Present |
| 3 | 00100C | Online-Storage2 | F200 | Present |
| ⋮ | ⋮ | ⋮ | ⋮ | ⋮ |

FIG. 11

< Physical Configuration Information >

122

| Storage Unit ID | 00100A |
| --- | --- |
| Cache Capacity | 32GB |

| Port ID | Use Condition |
| --- | --- |
| CL1-A | Used |
| CL1-B | Used |
| ......... | ......... |

| Physical Disk ID | Capacity | RAID Type | Use Condition | RAID Group ID |
| --- | --- | --- | --- | --- |
| 001 | 72GB | 5 | Used | 1 |
| 002 | 72GB | 5 | Used | 1 |
| 003 | 72GB | 5 | Used | 1 |
| 004 | 72GB | 5 | Used | 1 |
| 005 | 48GB | 1 | Used | 2 |
| 006 | 48GB | 1 | Used | 2 |
| 007 | 72GB | — | Not Used | — |
| ......... | | | | ......... |

FIG. 12

< Logical Configuration Information >   123

| SLPR-ID | CLPR-ID |
|---------|---------|
| SLPR1   | CLPR1   |
| SLPR2   | CLPR2   |
| ⋮       | ⋮       |

| Overall Cache Capacity | 32GB |
|---|---|
| CLPR-ID | Assigned Capacity |
| CLPR1 | 12GB |
| CLPR2 | 8GB |
| ⋮ | ⋮ |

| Logical Device ID | RAID Group | RAID Type | Capacity | Use Condition | SLPR-ID | CLPR-ID |
|---|---|---|---|---|---|---|
| 1 | 1 | 5 | 36GB | Used | SLPR1 | CLPR1 |
| 2 | 1 | 5 | 36GB | Used | SLPR1 | CLPR1 |
| 3 | 1 | 5 | 36GB | Used | SLPR2 | CLPR2 |
| 4 | 1 | 5 | 36GB | Used | SLPR2 | CLPR2 |
| ⋮ | ⋮ | ⋮ | ⋮ | ⋮ | ⋮ | ⋮ |

| Port ID | Use Condition | Path Configuration | | | | SLPR-ID | CLPR-ID |
|---|---|---|---|---|---|---|---|
| | | Host Group | LU No. | Logical Device ID | CMD Definition | | |
| CL1-A | Used | Grp1 | 0 | 1 | — | SLPR1 | CLPR1 |
|       |      |      | 1 | 2 | — | SLPR1 | CLPR1 |
| CL1-B | Used | Grp2 | 0 | 3 | — | SLPR2 | CLPR2 |
|       |      |      | 1 | 4 | ON | CLPR2 | CLPR2 |
| ⋮ | ⋮ | ⋮ | ⋮ | ⋮ | ⋮ | ⋮ | ⋮ |

FIG. 13

<Migration Configuration Conversion Table>　　68D

| Transfer-Source Configuration Information | | | | | | | |
|---|---|---|---|---|---|---|---|
| Transfer-Source Storage Unit ID | 00100A | | | | | | |
| Transfer-Source Cache Capacity | 12GB | | | | | | |
| Port ID used | Use Condition | Configuration Information | | | | | |
| | | Host Group | LU No. | Logical Device ID | Capacity | RAID Type | CMD Definition |
| CL1-A | Used | Grp1 | 0 | 1 | 36GB | 5 | — |
| | | | 1 | 2 | 36GB | 5 | — |
| CL1-B | Used | Grp2 | 0 | 3 | 36GB | 5 | — |
| | | | 1 | 4 | 36GB | 5 | ON |
| Transfer-Destination Configuration Information | | | | | | | |
| Transfer-Destination Storage Unit ID | 11100A | | | | | | |
| Setting SLPR-ID | SLPR1 | | | | | | |
| Setting CLPR-ID | CLPR1 | | | | | | |
| Setting CLPR Assigned Capacity | 12GB | | | | | | |
| Port ID applied | With or Without Use | Transfer-Destination Applied Configuration Information | | | | | |
| | | Host Group | LU No. | Logical Device ID | Capacity | RAID Type | CMD Definition |
| CL2-E | Use | Grp1 | 0 | 105 | 36GB | 5 | — |
| | | | 1 | 118 | 36GB | 5 | — |
| CL2-F | Use | Grp2 | 0 | 120 | 36GB | 1 | — |
| | | | 1 | 125 | 36GB | 1 | Required |

FIG. 14

< User Account Control Table >   68G

| User Account | Control Target SLPR-ID | Control Target CLPR-ID |
|---|---|---|
| All | (Whole Storage Unit) | (Whole Storage Unit) |
| Database Maintenance | SLPR1 | CLPR1 |
| Development | SLPR2 | CLPR2 |
|  | SLPR3 | CLPR3 |
| ⋮ | ⋮ | ⋮ |

# LOGICAL PARTITION CONVERSION FOR MIGRATION BETWEEN STORAGE UNITS

CROSS-REFERENCE TO RELATED APPLICATION

This application is a Continuation of U.S. application Ser. No. 11/694,095 filed on Mar. 30, 2007, now U.S. Pat. No. 7,305,533 which is a Continuation of U.S. application Ser. No. 11/017,967 filed on Dec. 22, 2004, now U.S. Pat. No. 7,213,115, which claims priority from Japanese Patent Application No. 2004-318082 filed on Nov. 1, 2004, the content of which is hereby incorporated by reference into this application.

BACKGROUND OF THE INVENTION

The present invention relates to a storage system configuring a storage unit that carries out control to store data in a storage area and more particularly to a technique for migrating configuration and data of the storage unit.

Hitherto, in a storage system that communicably connects a host unit such as task server which the user uses and a storage unit, the storage unit carries out control to store the data from a host unit in a storage area which the storage unit such as hard disk drive provides. To use the storage system, it is necessary to set and hold configuration information in the storage unit.

The configuration information is various pieces of setting information on physical and logical configurations such as a configuration of connection paths (also called logical paths) recognized by the host unit and a configuration of a storage volume of a logical device etc. ensured on a storage device between the host unit and the storage unit. The physical configuration information is information on, for example, a physical port and a physical disk. The logical configuration information is information on, for example, a logical port and a logical device logically configured and set on the physical configuration.

Conventionally, when a configuration of a storage unit or data stored in a storage volume is transferred to other storage unit, for example, in the case of replacing the old storage unit with a new storage unit, the following procedure involving a personal operation and a computer processing has been necessary. For example, in replacing the old storage unit with the new storage unit, firstly, a person in charge thereof understands the content of configuration information held on memory in the old storage unit, and carries out the environment setting work so that the same configuration as that of the old storage unit can be achieved in the new storage unit. The person in charge thereof is a person who utilizes and administers a storage unit and a storage system including the storage unit, such as a system administrator. Migration of the configuration corresponds to the migration of the configuration information. Then, after setting the new storage unit, the stored data in the old storage unit is copied to the new storage unit. That is, the old storage unit and the new storage unit are connected to the host unit or control device, etc. that can implement data copy therebetween, and the data copy from the old storage unit to the new storage unit is carried out. Or, the stored data in the old storage unit is temporarily backed up into a backup medium such as a magnetic tape, and the backup data is restored to the new storage unit. Or, if the new and old storage units have a remote copy function of directly copy-processing the data of the storage volume such as a logical device, it is possible to migrate the data by the use of this remote function.

In Japanese Patent Laid-Open No. 2004-102374, a technique that carries out changes in access paths associated with data migration between storage units is described.

SUMMARY OF THE INVENTION

In recent years, a storage unit which has a logical partition function has begun to be utilized. If the old storage unit does not have a logical partition function and the new storage unit has a logical partition function and the configuration and data of the old storage unit serving as a transfer source are migrated to a logical partition configuration and data of the new storage unit serving as a transfer destination, the person in charge thereof must convert the configuration information of the old storage unit to the setting items of the logical partition configuration of the new storage unit and carry out the setting operation.

Almost all the migration concerning the configuration and data of the storage unit involves comparatively complicated personal work including understanding and converting of the configuration information, thereby resulting in a large burden.

In addition, when the logical partition function of the transfer-destination storage unit is used and the setting of the configuration including the logical partition configuration of the transfer-destination storage unit is implemented, because the construction of the configuration information differs between the transfer-source storage unit with no logical partition function and the transfer-destination storage unit with the logical partition function, the migration as it is, that is, the migration by simply moving the configuration information and the copy from a transfer source to a transfer destination cannot be carried out.

In the technique described in Japanese Patent Laid-Open No. 2004-102374, in the case of the migration from the transfer-source configuration with no logical partition to the transfer-destination configuration with logical partition configuration, the migration is impossible similarly.

The present invention is made in view of the foregoing problems, and an object of the present invention is to provide a technique, which can efficiently carry out the migration between the storage units having different constructions in the configuration information due to presence or absence of the logical partition function and can alleviate burdens of personal operations by the administrator in migrating configuration and data from one storage unit to the other storage unit.

Outlines of representative ones of inventions disclosed in the present application will be briefly described as follows.

In order to achieve the above object, a storage system according to the present invention comprises one or more storage units each having a storage device and a controller to control storage of data in the storage device, wherein the storage unit is configured to have configuration information that includes logical configuration information held on a memory, and the storage system has the features of provided the following technical means:

First of all, there is considered the case in which configuration of one or more storage units is introduced into a configuration control means of a batch controllable storage control server and others via a network and others and operated in an existing storage system. In such event, an attention is placed on the fact that configuration information of the transfer-source storage unit which is in operation and serves as a target to have a configuration and data migrated is held and controlled by the configuration control means. As described above, when the construction of the configuration information differs between the transfer-source and the transfer-destination configuration and the data cannot be migrated as it is. Therefore, in the storage system according to the present invention, by the configuration of having a server unit communicably connected to the above-mentioned one or more storage units equipped as a configuration control means to carry out migration control of the configuration and data, and in the server unit, the configuration information of each storage unit is collection-processed and held and controlled in a batch in the table inside the server unit and, at the same time, using the configuration information to be held, the configuration information is conversion-processed for migrating the configuration. That is, in the server unit, a process is carried out to convert configuration information of the transfer-source storage unit to information necessary to set the logical partition configuration in the transfer-destination storage unit having a logical partition function. The server unit transmits the information prepared by the conversion to the transfer-destination storage unit, and by the transmitted information, establishment or updating of the configuration of the transfer-destination storage unit is carried out. In addition, because in the present storage system, by the migration of configuration, the setting relation of storage volume of logical device and others is understood between the transfer-source and the transfer-destination storage units, after the configuration is migrated, under the control of the server unit, processing to migrate the stored data of the storage volume is performed between the transfer-source and the transfer-destination storage units.

The storage system according to the present invention comprises, in particular, a migration control means that controls migration concerning configuration and data between the first storage unit with no logical partition function that enables logical partition configuration to restrict access to resources of usable logical configuration to specific users and the second storage unit with a logical partition function.

The migration control means migrates configuration by converting the configuration of the transfer-source first storage unit to the logical partition configuration of the transfer-destination second storage unit based on the configuration information and by updating configuration of the second storage unit, and after migration of the configuration, successively migrates the stored data from the first storage unit to the second storage unit by the use of a data copy means to copy the data between the first storage unit and the second storage unit. When the data is left in the transfer-source data copying is carried out. When the data is not left in the transfer-source the data is migrated.

In addition, a storage system according to the present invention comprise a server unit (storage control server) to which each storage unit including the transfer-source first storage unit and the transfer-destination second storage unit are communicably connected as a migration control means that controls the migration about the configuration and data between the first storage unit having no logical partition function and the second storage unit having a logical partition function.

The server collects the configuration information of each storage unit and holds and controls it in a table, converts the configuration of the first storage unit to the logical partition configuration of the second storage unit in accordance with the configuration information in the table in response to the direction of migration, transmits the information prepared by the conversion to the second storage unit and updates the configuration of the second storage unit, and, after migration of the configuration, successively migrates the stored data of the storage volume from the first storage unit to the second storage unit by using a data copy means to copy the data between the first storage unit and the second storage unit.

In addition, the storage unit carries out a process for referring/updating configuration information held on the memory as required by a processor unit (SVP) for maintenance and control of, for example, its own storage unit, reads and transmits the configuration information on the memory in accordance with the request from the unit such as the external server unit and others, and receives information from the external unit in accordance with the request from the external unit and reflects it to the configuration information on the memory.

Furthermore, the storage unit is configured to hold configuration information including logical configuration information on a path configuration for access between the host unit and the storage volume of the storage unit, a storage volume configuration such as a logical device assignment configuration and others, and a logical configuration including a cache configuration such as cash capacity and others on the memory.

The second storage unit can configure the first logical partition concerning the cache configuration (cache logical partition) and the second logical partition concerning other configurations including the path configuration and the storage volume configuration (storage logical partition).

The server unit converts the transfer-source cache configuration to the first logical partition and other configuration including the path configuration and the storage volume configuration to the second logical partition as a logical partition configuration in the transfer-destination second storage unit in accordance with a direction of the migration.

In addition, in the data migration process, as a data copy means, data is transmitted by using a remote copy function of remote-copying the stored data of the storage volume that forms a copy pair between the transfer-source first storage unit and the transfer-destination second storage unit.

In addition, in other storage system according to the present invention, migration control of the configuration is carried out and the migration of data is not carried out. The storage system has a server unit to which each storage unit including the transfer-source first storage unit and the transfer-destination second storage unit is communicably connected as a migration control means about a configuration between the first storage unit having no logical partition function and the second storage unit having a logical partition function. The server unit collects configuration information of each storage unit and holds and controls it in a table, and converts the configuration of the first storage unit to the logical partition configuration of the second storage unit in accordance with the configuration information in the table in response to the direction of migration, and transmits the information prepared by the conversion to the second storage unit and updates the configuration.

In another storage system according to the present invention, transmission and receipt of the processed information of configuration information and others are not carried out between the units, but the processed information is migrated by using the recording media through an operation of the person in charge of migration. The present storage system comprises an information processor unit in which a conversion program (migration configuration conversion program) runs to carry out a conversion process for the configuration information of the transfer-source and the transfer-destination storage units with respect to the migration concerning a configuration between the first storage unit having no logical partition function that enables the logical partition configuration and the second storage unit having a logical partition function.

In the event of migration, by an operation of the person in charge intervened, the configuration information read respectively from the first and the second storage units and stored in the recording medium is imported by a conversion program that runs on the information processor unit. And, based on this information, the configuration of the first storage unit is converted to the logical partition configuration of the second storage unit by the conversion program. And, the information prepared by the conversion processing is stored in the recording medium. And, the stored information is read by the second storage unit and, by this information, the configuration information in the second storage unit is updated.

Effects obtained from representative ones of inventions disclosed in the present application will be briefly described as follows.

According to the present invention, in carrying out migration of the configuration or data from one storage unit into the other storage unit, the migration between the storage units depending on constructions of the configuration information by the presence or the absence of a logical partition function can be efficiently achieved, and a burden of the personal operation by the administrator and others can be alleviated. In particular, the configuration and the stored data having no logical partition of the transfer-source storage unit can be migrated, as the logical partition configuration and the stored data of the transfer-destination storage unit.

BRIEF DESCRIPTION OF THE DRAWINGS

FIG. 11 is a diagram showing details of physical configuration information in a storage system that is one embodiment of the present invention.

FIG. 12 is a diagram showing details of logical configuration information in a storage system that is one embodiment of the present invention.

FIG. 13 is a diagram showing details of a migration configuration conversion table in a storage system that is one embodiment of the present invention.

FIG. 14 is a diagram showing details of a user account control table in a storage system that is one embodiment of the present invention.

DESCRIPTION OF THE PREFERRED EMBODIMENTS

Figure 1:
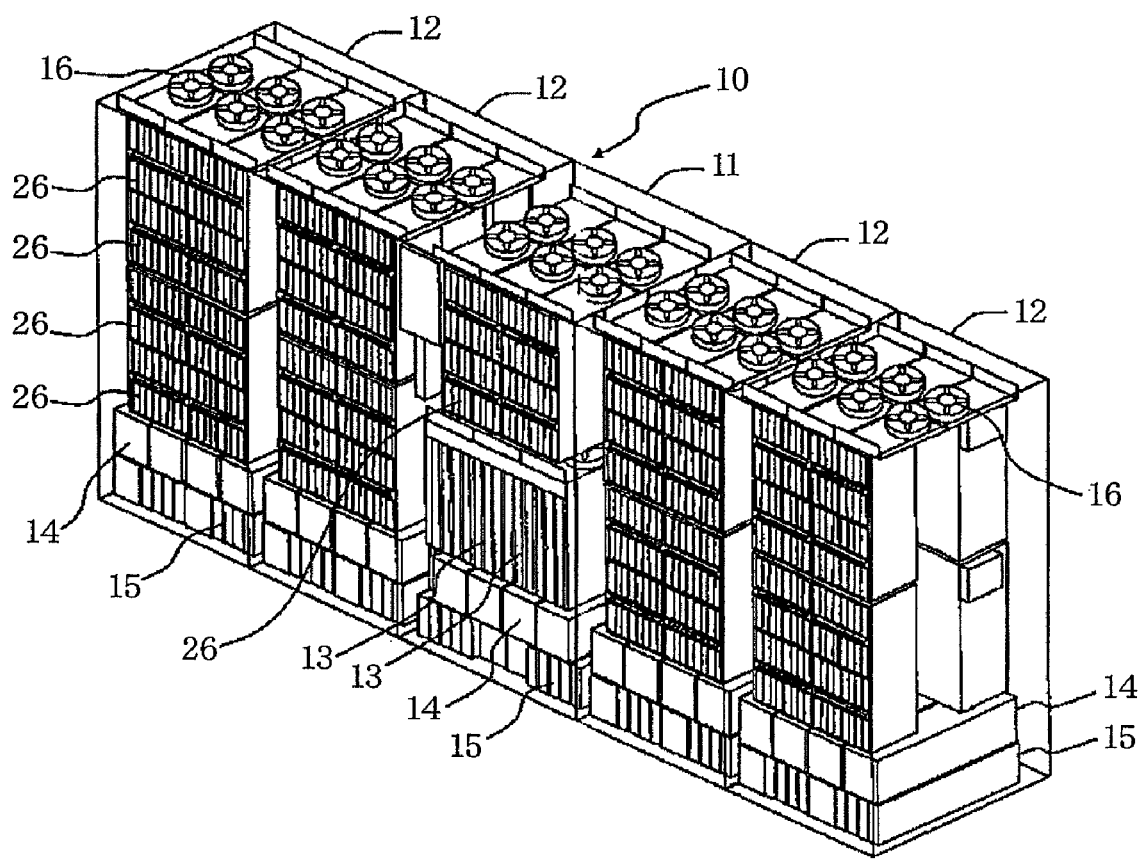
FIG. 1 is a diagram showing a hardware appearance configuration of a storage unit configuring a storage system that is one embodiment of the present invention.

Hereinafter, an embodiment of the present invention will be detailed based on the drawings.

FIGS. 1 to 18 are diagrams for explaining a storage system that is a representative embodiment of the present invention. In a storage system of the present embodiment, there is carried out a process for migrating both of a configuration with no logical partition function and stored data in a plurality of, in particular, two transfer-source storage units (100), to one transfer-destination storage unit (110) with a logical partition function. The present storage system has a storage control server (60) communicably connected to storage units (10) which the system has inside, and, under normal conditions, configuration control of each storage unit (10) is carried out by the storage control server (60), that is, batch control of configuration information (1) is carried out. Migration is controlled by the storage control server (60). In the event of the migration, a conversion process is carried out in such a manner that configuration information (1) of each transfer-source storage unit (100) corresponds to each logical partition configuration in the transfer-destination storage unit (110). In addition, after migrating the configuration from the transfer source to the transfer destination successively, a process for migrating stored data from the transfer-source to the transfer-destination configuration is performed.

In the present embodiment, as a migration example, explanation will be made of the case where an old storage unit (100) is replaced with a new storage unit (110) as the migration of the configuration and data, that is, the case where the configuration and stored data of the old storage unit (100) are reflected to an independent logical partition configuration in the new storage unit (110) in order to change to the use of the new storage unit (110). In addition, explanation will be made in particular of the case where a plurality of the transfer-source storage units 100 are consolidated into one transfer-destination storage unit 110, that is, configuration and data of each transfer-source storage unit 100 is converted to a plurality of independent logical partition configurations in one transfer-destination storage unit 110.

<Hardware Configuration>

FIG. 1 is a perspective view showing a hardware appearance configuration of a storage unit 10 that is one embodiment of the present invention. The storage unit 10 can be configured by, for example, a basic chassis 11 and a plurality of extended chassis 12. The basic chassis 11 is a minimum configuration unit of the storage unit 10 and is equipped with both control function which a controller and others assume and a storage function which a storage device assumes. The control function is a function of controlling storage of data for a storage device in response to an order from a host unit and others. The controller is configured, for example, by mutually connecting control packages 13 per function. The storage function is a function of storing user data and other data in a storage area. In the case of the present embodiment, a disk drive 26 as a storage device provides a storage area. The extended chassis 12 is an option of the storage unit 10 and is equipped with a storage function, and controlled by the control function which the basic chassis 11 has. For example, to the basic chassis 11, four extended chassis 12 can be connected. Each chassis is connected by communication cables.

To the basic chassis 11, a plurality of control packages 13, a plurality of power supply units 14, a plurality of battery units 15, and a plurality of disk drives 26 are detachably provided. To an upper portion etc. of the chassis, a plurality of cooling fans 16 are provided, respectively. The power supply unit 14 supplies power to each unit inside the chassis. The battery unit 15 functions as backup power supply. The cooling fan 16 cools an interior of the chassis. The disk drive 26 is a storage device for storing data.

The control package 13 is a module that enables each unit of channel adapters (CHAs) 36, disk adapters (DKAs) 34, and a cache memory 35, etc. as later described, respectively. The control package 13 is one in which a mechanical structure for attaching the chassis is added to a function-mounted board. To basic chassis 11, as a control package 13, a plurality of CHA packages, a plurality of DKA packages, one or more memory packages, and others are detachably mounted and can be replaced in units of the control package 13. Each control package 13 is inserted in a slot provided in the chassis and is connected to a board for mutually connecting each unit.

<System Configuration>

Figure 2:
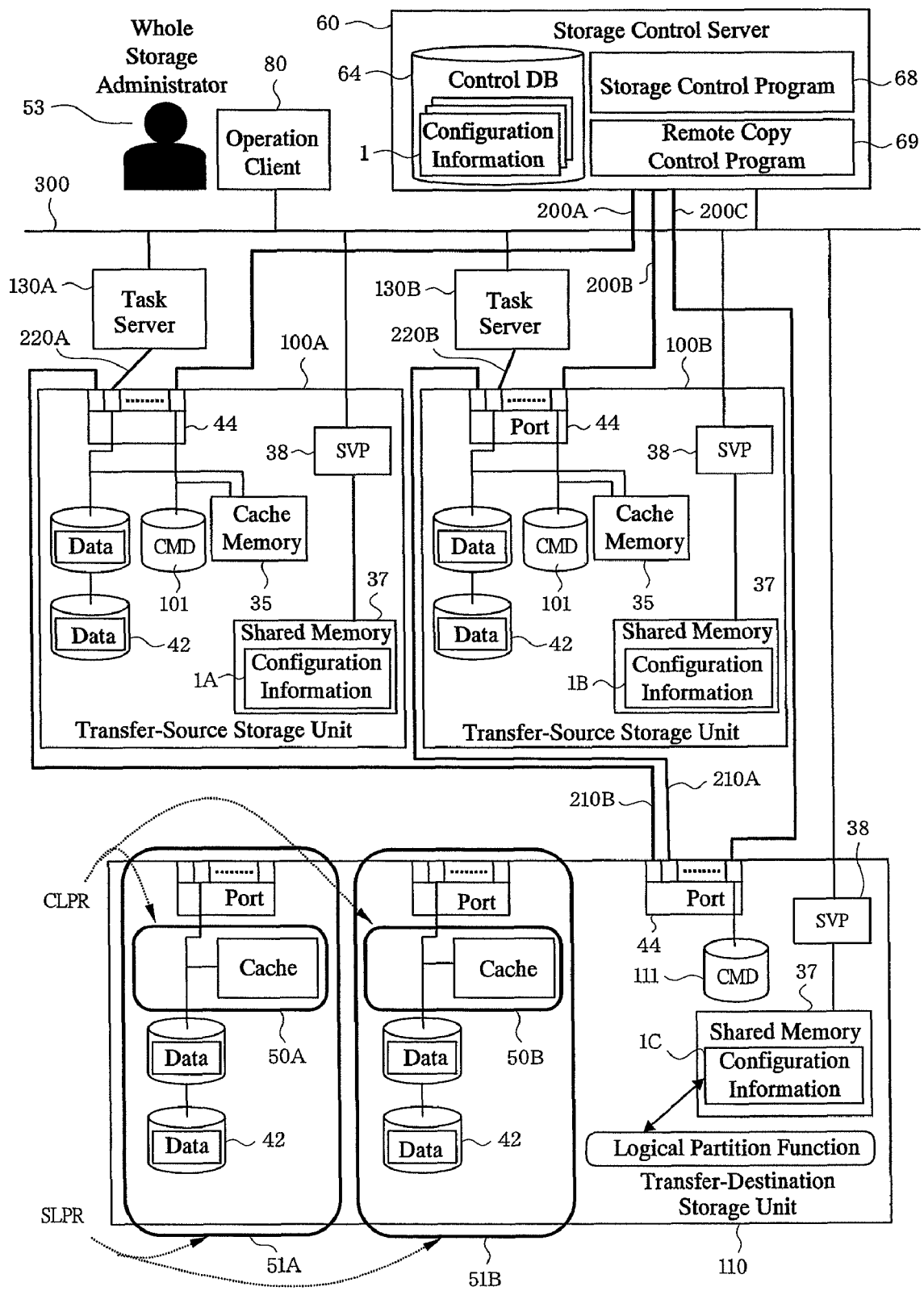
FIG. 2 is a diagram showing a configuration of a storage system which is one typical embodiment of the present invention.

FIG. 2 shows a system configuration related to a migration system in a storage system of the present embodiment. The present storage system comprises transfer-source storage units 100 {100A, 100B}, a transfer-destination storage unit 110, task servers 130 {130A, 130B}, a storage control server 60, an operation client 80, and a communication means for connecting these. For example, the storage system is configured so as to have two transfer-source storage units 100A, 100B as the transfer-source storage unit 100, two task servers 130A, 103B as the corresponding task server 130, one transfer-destination storage unit 110, one storage control server 60, and one operation client 80. Note that, in the event that the transfer-source/transfer-destination are not distinguished, they are collectively called "storage system 10" and others.

As the communication means, the storage system has a network 300, communication routes 200A, 200B, 200C, 210A, 210B, 220A, 220B, and others. Each unit is equipped with a communication processor unit for carrying out a communication process on these network 300 and communication routes.

The network 300 connects the transfer-source storage units 100A, 100B and the transfer-destination storage unit 110 and the task servers 130A, 130B and the storage control server 60 and the operation client 80. The network 300 is, for example, LAN and others, on which communication for control and others is carried out. To the network 300, a SVP (service processor) 38 of each storage unit 100, 110 is connected.

The communication routes 220A and 220B connect the transfer-source storage units 100A, 100B and the task servers 130A, 130B, respectively. The communication routes 220A, 220B serve as links for online task processes by the task servers 130A, 130B.

The communication routes 200A, 200B connect the transfer-source storage units 100A, 100B to the task servers 130A, 130B, respectively. The communication route 200C connects the transfer-destination storage unit 110 to the storage control server 60. The communication routes 200A, 200B, 200C are links for remote copy control.

The communication routes 210A, 210B connect the transfer-source storage units 100A, 100B to the transfer-destination storage unit 110, respectively. The communication routes 210A, 210B are links for remote copy.

Each of the above communication routes comprises, for example, a port equipped to each unit and a communication cable connected between the ports. A communication path such as the communication route 200A and the communication route 210A, and a communication processor unit equipped to each unit correspond to, for example, a fiber channel protocol.

Each storage unit 10 has a configuration which comprises a controller, a storage unit, a SVP 38, and others. The controller and the storage device are connected. The controller comprises a port 44, a cache memory 35, a shared memory 37, and a SVP 38. The port 44, a logical device 42, a cache memory 35, and others are resources useable from the task server 130. As a storage volume on the storage device, the storage unit has a logical device 42. The logical device 42 is used to store data inputted from and outputted to the task server 130. In addition, of the logical devices 42, there are CMD devices (command devices) 101, 111, and others used for carrying out command control. In the present embodiment, the CMD devices 101, 111 are the logical device 42, in particular, for remote copy control. The port 44 is used for communication connection with an external unit. In the cache memory 35, I/O data and others for the logical device 42 are stored.

In each storage unit 10, various pieces of information including the configuration information 1 are held on the shared memory 37. The transfer-source storage units 100A, 100B hold the configuration information 1A, 1B on the shared memory 37, respectively. The transfer-destination storage unit 110 holds configuration information 1C on the shared memory 37. The configuration information 1 may not be limited to the shared memory 37 but may be of a form to be held on other memory in the storage unit 10. The configuration information 1A, 1B of the transfer-source storage units 100A, 100B includes logical configuration information such as setting information on the port 44 and the logical device 42, setting information on the mounted cache memory 35, and the like, wherein information related to connection path configuration, logical device configuration, and cache memory configuration, etc. is controlled.

The transfer-source storage units 100A, 100B are existing old storage units in the event of the migration of configuration and data. The transfer-destination storage unit 110 is a new storage unit to be newly introduced and to have been introduced in the event of migration. In the present embodiment, in particular, two units of the transfer-source storage units 100A, 100B are controlled and the migration of configuration and data is carried out to one transfer-destination storage unit 110.

The transfer-source storage unit 100 has no logical partition function and the transfer-destination storage unit 110 has a logical partition function. The logical partition function is a function of setting two kinds of logical partitions, i.e., a storage logical partition (abbreviated as "SLPR") 51 and a cache logical partition (abbreviated as "CLPR") 50, and of enabling control and operations. The transfer-destination storage unit 110 has the SLPR 51A and the CLPR 50A that support the configuration of the transfer-source storage unit 100A as well as the SLPR 51B and the CLPR 50B that support the configuration of the transfer-source storage unit 110 as a logical partition newly set in accordance with the migration. The configuration information 1C of the transfer-destination storage unit 110 is information of construction that supports the logical partition configuration by the logical partition function.

The SVP 38 is a processor that carries out various kinds of processes related to maintenance and control with the corresponding storage unit 10 set as a target. The SVP 38 can communicate with the storage control server 60 and other external unit on the network 300. The SVP 38 and the storage control server 60 carry out communication related to control of the storage units 100, 110. The SVP 38 is connected to the shared memory 37, and accesses the configuration information 1 on the shared memory 37 and can be read and written. The SVP 38 is equipped with conventional maintenance and control functions and, at the same time, with respect to the present invention, is, in particular, equipped with a function of controlling the configuration information 1 of the storage unit 10 and carrying out a communication process concerning the configuration control and migration with the external storage control server 60. For example, the SVP 38, which is included in the transfer-source storage unit 100A, controls the configuration information 1A with respect to the transfer-source storage unit 100A. In the present embodiment, the SVP 38 is in the form of being connected to and accommodated in the storage unit 10 and communicably connected to each processor unit in the controller. Note that the SVP 38 may be in the form of being externally connected to the storage unit 10 or remotely connected via the network and others. In addition, the SVP 38 may be in the form of installing a control program on a general-purpose computer such as a notebook type PC and others or be in the form of a processor dedicated to a control process.

The storage control server 60 is an information processor unit equipped with a function as a migration control means which carries out migration control of configuration and stored data of the storage unit 10. The storage control server 60 has a function as a configuration control means to carry out configuration control of one or more storage units 10 communicably connected via the network 300, that is, batch control of the configuration information 1 and, at the same time, has a function as a configuration converting means to carry out a conversion process of the configuration information 1 for migration. The storage control server 60 has a program such as a storage control program 68 implementing each function and a remote copy control program 69, and a control DB (storage control database) 64 that stores the configuration information 1 (1A, 1B, 1C and others) of each storage unit 10. The configuration information 1 held in the control DB 64 includes a copy related to the configuration information 1 which each storage unit 10 holds on the common memory 37.

The storage control server 60 acquires the configuration information on the shared memory by a collection process etc. through communication with the control DB 64 via the network 300 under the normal conditions and is reflected to the configuration information 1 of the control DB 64.

The task servers 130A, 130B are information processor units which serve as hosts to the storage unit 10, and are used by each user. The task server 130 carries out a system operation such as an online task process etc. by the use of the storage volume inside the storage unit 10 and by the functions to be provided. In the communication routes 220A, 220B, one or more ports are used among the ports 44 which the storage unit 10 has. The task server 130 stores the data in the logical device 42 of the storage unit 100. In the foregoing system operation, for example, an access is made for requesting a data I/O to the storage unit 100A by a storage utilization program on the task server 130A, and the online task process is carried out by the application program on task server 130A. The same is applied to the task server 130B and the transfer-source storage unit 100B. The host unit connected to the storage unit 10 is expressed by, for example, "personal computer", "workstation", "mainframe computer", and others, in addition to the form of the task server 130.

The operation client 80 is an information processor unit in which a controller authorized to control the system carries out an operation such as an instruction related to control of the configuration of the storage unit 10 and to migration of the configuration and data. The operation client 80 is, for example, in the form of a PC. In the present embodiment, the whole storage administrator controller 53, who is a administrator for controlling the whole storage system or the whole transfer-destination storage unit 110, operates the operation client 80, and issues directions related to the configuration and data migration to the storage control server 60. The operation client 80 transmits various kinds of requests to the storage control server 60 via the network 300, and the storage control server 60 processes the requests and transmits a response to the operation client 80. On the output unit of the operation client 80, various pieces of information are displayed by a user interface of Web page, and others. Note that, from the operation client 80, it is possible to communicate with the task server 130 and the SVP 38 of each storage unit 10 via the network 300.

The whole storage administrator 53 selects the target storage unit 10 from a plurality of storage units 10 controlled by the storage control server 60 using the operation client 80 and can carry out the operation.

In the event that the logical configuration of the storage unit 10 which is controlled by the storage control server 60 is changed, the whole storage administrator 53 gives an instruction to change the configuration to the storage control 60 by the use of the operation client 80. The storage control server 60 transmits the setting update information, that is, the information to update the configuration information 1 held by the shared memory 37 to the SVP 38 of the target storage unit 10 in accordance with directions of the operation client 80. The SVP 38 actually implements the change of the logical configuration of the storage unit 10 by reflecting the setting update information received from the storage control server 60 with respect to the configuration information 1 on the shared memory 37.

<Migration Process>

A migration process in the present storage system is generally carried out as follows. As a migration example, in particular, there is shown the case where the configurations of two transfer-source storage units 100A, 100B are consolidated, as independent logical partition configurations, into an interior of one transfer-destination storage unit 110. In a procedure for the migration process, operations by the administrator are included partly in operations of entering instructions or setting hardware and others.

Under the conditions before the migration, the transfer-source storage units 100A, 100B have control configurations 1A, 1B controlled by the storage control server 60, and the storage control server 60 holds respective copies of the configuration information 1A, 1B as configuration information 1 in the control DB 64. The transfer-destination storage unit 110 newly introduced and installed to the old system is connected to the network 300, and the configuration is controlled in the same manner as the existing transfer-source storage units 100A, 100B by the storage control server 60. That is, the storage control server 60 reads the configuration information 1C on the shared memory 37 via the SVP 38 of the transfer-destination storage unit 110 and stores it in the control DB 64. For the condition of the transfer-destination storage unit 110, setting of the logical configuration inside the storage unit may not particularly be carried out and the condition, in which the logic configuration may be set as it is in the default condition, is acceptable. Or, the condition, in which such logical partition that the migration of the configuration and the stored data from the transfer-source storage unit 100 is not assumed may be set in advance, is acceptable, too.

Under the condition in which the transfer-source storage units 100A, 100B and the transfer-destination storage unit 110 are controlled by the storage control server 60, the whole storage administrator 53 gives an instruction to carry out a migration process to the storage control server 60 by the use of the operation client 80. In the event of the above instruction, the whole storage administrator 53 chooses the transfer-source storage units 100A, 100B as well as the transfer-destination storage unit 110, and designates a CLPR name and a SLPR name respectively for the logical partitions to be prepared at the transfer destination.

The storage control server 60 first checks the internal resources of ports, logical devices, and others of the transfer-destination storage unit 110 to judge whether or not the configuration of the transfer-source storage units 100A, 100B can be migrated as the logical partition configuration of the transfer-destination storage unit 110 based on the content directed from the whole storage administrator 53 via the operation client 80. As a result of the check, if the migration is possible, the storage control server 60 converts the conventional configuration information 1A, 1B in the transfer-source storage units 100A, 100B to the configuration information 1C on a new logical partition configuration of the transfer-destination storage unit 110 by the storage control program 68. In the event of the conversion process, the latest configuration information 1 on each storage unit 10 held in the control DB 64 is used.

In the storage control server 60, the configuration information 1 converted to support the transfer-destination logical partition configuration is used as the information for updating the setting update information of the transfer-destination storage unit 110, that is, the information for updating the setting of the configuration. And, a portion of the configuration information 1 of the transfer-destination storage unit 110 held in the control DB 64 is first updated by this setting update information. And, the storage control server 60 transmits the setting update information, directions of setting the update process, and others to the SVP 38 of the transfer-destination storage unit 110.

The SVP 38 of the transfer-destination storage unit 110 updates configuration information 1C on the shared memory 37 by the received setting update information since it receives the setting update information and implements the migration of the logical configuration in the logical partition configuration on which a conversion process has been carried out as the transfer destination such as the SLPRs 51A, 51B and the CLPRs 50A, 50B as the logical partition.

In the event that each of the CLPR name and the SLPR name assigned as the setting item of the transfer destination is duplicated with the existing logical partition name or is invalid setting, or in the event that the migration process is carried out with the unset name, for example, a mandatory assignment of a unique name is carried out, on a side of the storage control server 60.

Upon completion of the migration of the logical configuration, if the data migration is read between the transfer-source storage unit 100 and the transfer-destination storage unit 110, that is, in the case of the condition in which the remote copy environment has been created, the remote copy process is carried out for the stored data between the transfer-source storage unit 100 and the transfer-destination storage unit 110. That is, based on the instruction/control by the storage control server 60, by using the logical device 42 of the transfer-source storage unit 100 set as a master volume and the logical device 42 uniquely associated with an interior of the transfer-destination logical partition corresponding to the master volume set as a slave volume, the remote copy process is carried out between the two volumes. By this, the data stored in the old storage unit is migrated to the new storage unit, that is, copy or migration is carried out. In the case of the present embodiment, as a means to migrate the data, a remote copy function is utilized, which is a function of carrying out copy of the logical device data between the storage units 10 without interposing the host unit. The present remote copy function itself uses a conventional technique. As the means to migrate the data, not only remote copy function but another means as shown in the foregoing conventional technique may be used.

Before starting the data migration, the preparation must be finished. The condition, in which preparation for data migration is finished when the remote copy function is used, means a state in which the following conditions are satisfied: (1) the transfer-source storage unit 100 and the transfer-destination storage unit 110 have remote copy functions; (2) in the communication routes 200A, 200B, 200C for remote copy control, the logical devices such as the CMD devices 101, 111 for the storage control server 60 to carry out the remote copy control are ensured and connected in advance; and (3) the communication routes 210A, 210B are ensured for remote copy, that is, for data transmission between the transfer-source storage unit 100 and the transfer-destination storage unit 110.

The CMD devices 101, 111 are logical devices ensure specially for remote copy control. At the CMD devices 101, 111, a command from the storage control server 60 is received and, based on the received command, the remote copy process between the chassis is carried out by a process of the DKA 34 and others in the administrator.

After the start of data migration, data is transmitted from a primary volume to a secondary volume and vice versa between the storage units through the transmission routes 210A, 210B while the remote copy control is being carried out through the communication routes 200A, 200B, 200C by the storage control server 60.

After completion of migration of the logical configuration and data, by only connecting each of the associated task servers 130, 130A, 130B to each logical partition in the transfer-destination storage unit 110, the task can be continued without carrying out particularly the complicated operation.

<Physical Configuration and Logical Configuration of Storage Unit>

Figure 3:
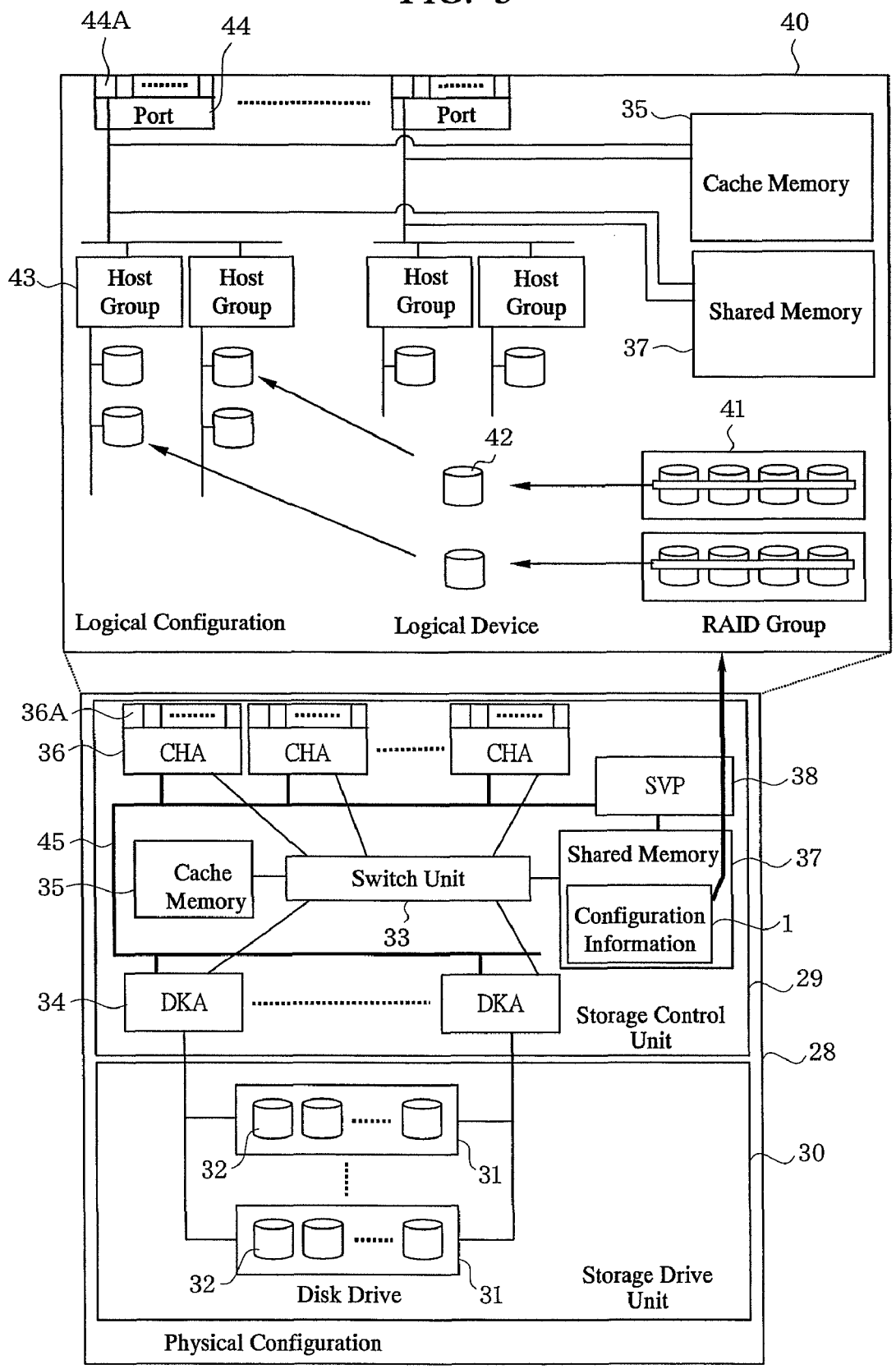
FIG. 3 is a diagram showing a basic configuration of a storage unit related to a storage system that is an embodiment of the present invention.

FIG. 3 is a block diagram showing the outline of the overall configuration of a storage unit having a conventional configuration, which is related to the present embodiment. A lower side indicates a physical configuration 28 of the storage unit, and an upper side indicates a logical configuration 40 of the storage unit established on the physical configuration 28. The configuration of the transfer-source storage units 100A, 100B corresponds to this physical configuration 28 and the logical configuration 40. The transfer-destination storage unit 110 is configured by a logical partition configuration added to this physical configuration 28 and the logical configuration 40.

The physical configuration 28 is associated with the storage unit 10. The storage control unit 29 is associated with the basic chassis 11 and the administrator. The storage drive unit 30 is associated with the extended chassis 12. The storage control unit 29 has CHAs 36 and DKAs 34, the switch unit 33 has a cache memory 35, a shared memory 37, and SVPs 38. The storage drive unit 30 has a disk-drive mounted box 31. On the disk-drive mounted box 31, a plurality of disk drives 32 are mounted.

In the storage control unit 29, each of the CHAs 36 controls data transmission between the host and others communicably connected to this. Each of the CHAs 36 is equipped with a communication port 36A. To the communication port 36A, a communication cable is connected. To the physical configuration 28, for example, as many as thirty-two pieces of CHAs 36 can be provided. For the CHAs 36, for example, those that support each communication protocol are prepared in accordance with the kind of host units and others to be communicably connected, such as a CHA for open system, a CHA for mainframe system, and others. For the CHAs 36, for example, those associated with each communication protocol are prepared in accordance with the kind of communicably connected host units and others are prepared. Each of the CHAs 36 receives a command and data having data reading and writing requested from the host unit and others connected through the communication port 36A, and operates in accordance with the received commands.

Each of the DKAs 34 may be installed in a plurality of quantities, such as 4 pieces, 8 pieces, and others in the physical configuration 28. Each of the DKAs 34 controls data communication with each disk drive 32, respectively. Each of the DKAs 34 and each disk drive 32 are connected via a communication network, for example, such as a SNA and others, and carries out block-by-block data transmission in conformity to the fiber channel protocol. Each DKA 34 monitors the condition of the disk drive 32, and the monitoring results are transmitted to the SVP 38 via the internal network 45.

In a data processing flow, when the CHA 36 receives a read command from the host computer via the communication port 36A, this read command is stored in the shared memory 37. The DKA 34 refers to the shared memory 37 from time to time and when any unprocessed read command is found, the data is read from the disk drive 32 and stored in the cache memory 35. The CHA 36 reads the data migrated to the cache memory 35 and transmits it to the host computer via the communication port 36A. In addition, when the CHA 36 receives a write command from the host computer, this write command is stored in the shared memory 37. The CHA 36 stores the received data (user data) in the cache memory 35. The CHA 21 notifies the completion of writing to the host computer after the data is stored in the cache memory 35. The DKA 34 reads the data stored in the cache memory 35 in accordance with the write command stored in the shared memory 37 and stores it in a specified disk drive 32.

Each CHA 36 and each DAK 34 comprise a printed circuit board on which, for example, processors, memories, etc. are mounted, and a control program housed in the memory, respectively, and, by collaboration of these pieces of hardware and software, the relevant specified functions can be actualized.

The cache memory 35 comprises, for example, a nonvolatile memory, and stores transfer data, for example, of user data and others on sides of the host unit and the disk drive 32.

The shared memory 37 comprises, for example, a nonvolatile memory, and stores, for example, control information, management information, and others. The control memory of the controller has the same configuration as that of the shared memory 37. In addition, control information and other information can be multiplicity-controlled by a plurality of shared memories 37.

The shared memory 37 and the cache memory 35 may be provided in a plurality of quantities. In addition, on the same memory substrate, the cache memory 35 and the shared memory 37 may be mounted so as to be mixed. Or, a portion of the area is used as a cache area by one memory, and the other area may be used as a control area.

The switch unit 33 connects each CHA 36, each DKA 34, the cache memory 35, and the shared memory 37, respectively. By this, all the CHAs 36 and the DKAs 34 are able to access the cache memory 35 and the shared memory 37, respectively. The switch unit 33 may be able to be configured as, for example, a super-high-speed crossbar switch etc.

In the physical configuration 28, a large number of disk drives 32 may be mounted. Each disk drive 32 is a physical storage device and, for example, can be actualized as a hard disk drive (HDD), a semiconductor memory device, and others.

Note that the storage resources used by the physical configuration 28 are not necessarily mounted in the physical configuration 28 of the same storage unit. It is possible to import and use the storage resources located outside the physical configuration 28 as if they are their own storage resources.

The SVP 38 is communicably connected to the CHA 36 and the DKA 34 via the internal network 45. The SVP 38 collects various pieces of information of the storage unit 10. In addition, by the configuration for the SVP 38 to connect the external network 300 such as LAN and others, it is possible to control the storage unit 10 via the SVP 38 from the external control device. In the case of the present embodiment, the storage unit 10 is able to be controlled from the storage control server 60 via the SVP 38. Note that the SVP 38 may be in the form of being connected outside the storage control unit 29.

In the various pieces of information held on the shared memory 37, there is held the setting control information of the storage unit 10 containing the configuration information 1 on the logical configuration 40 and the physical configuration 28.

The logical configuration 40 includes connection-port configuration information, logical-device configuration information, and others which are necessary when seen from the host side and when the storage unit 10 is actually used. The logical configuration 40 includes a RAID group 41, a logical device 42, ports 44, 44A, a host group 43, a cache memory 35, a shared memory 37, and others. The logical configuration information on these logical configurations 40 are contained in the configuration information 1.

The RAID group 41 establishes the RAID configuration to use multiple disk drives 32 as virtual logical areas. The RAID group 41 includes the setting for the disk drive 32. Though it differs in accordance with the RAID configuration and others, for example, on the physical storage area which a four-in-a-set disk drive 32 provides, the RAID group 41 which is a virtual logical area is established. Furthermore, on the RAID group 41, one or more virtual logical devices are set as logical units (LU), which can be used from the host side.

The logical device 42 is a storage volume which is actually accessible by the host on the RAID group 41. The logical device 42 is assigned to the host group 43 and is used.

The host group 43 actualizes access security and access switches, which enable the use of the logical device 42 and the device configuration varying in accordance with each host in such form that a plurality of hosts can access the same ports 44, 44A through fiber channel switches and other devices. It is possible to assign the logical device 42 and others under the command of each host group 43. The host group 43 is not particularly set when a single host makes an access to one port 44A.

The ports 44, 44A are used for communication between the storage unit 10 and the host and the other external devices. The port 44 becomes information assigned to the connection path configuration and the logical device 42 in the task server 130 and others. The port 44 integrates a plurality of ports 44A. The connection path (also called "logical path") is a logical access route to the logical device 42 which becomes a target when the host and others use the storage unit 10. The ports 44, 44A are assumed to correspond to the CHAs 36 as actual physical positions, but are expressed as ports as logical configuration information.

The cache memory 35, the shared memory 37 and other memories have the specified capacity secured and are used for the access to each logical device 42. The cache memory 35 is primarily used for storing processing data, while the shared memory 37 is primarily used for storing control information and others.

<Logical Partition>

Figure 4:
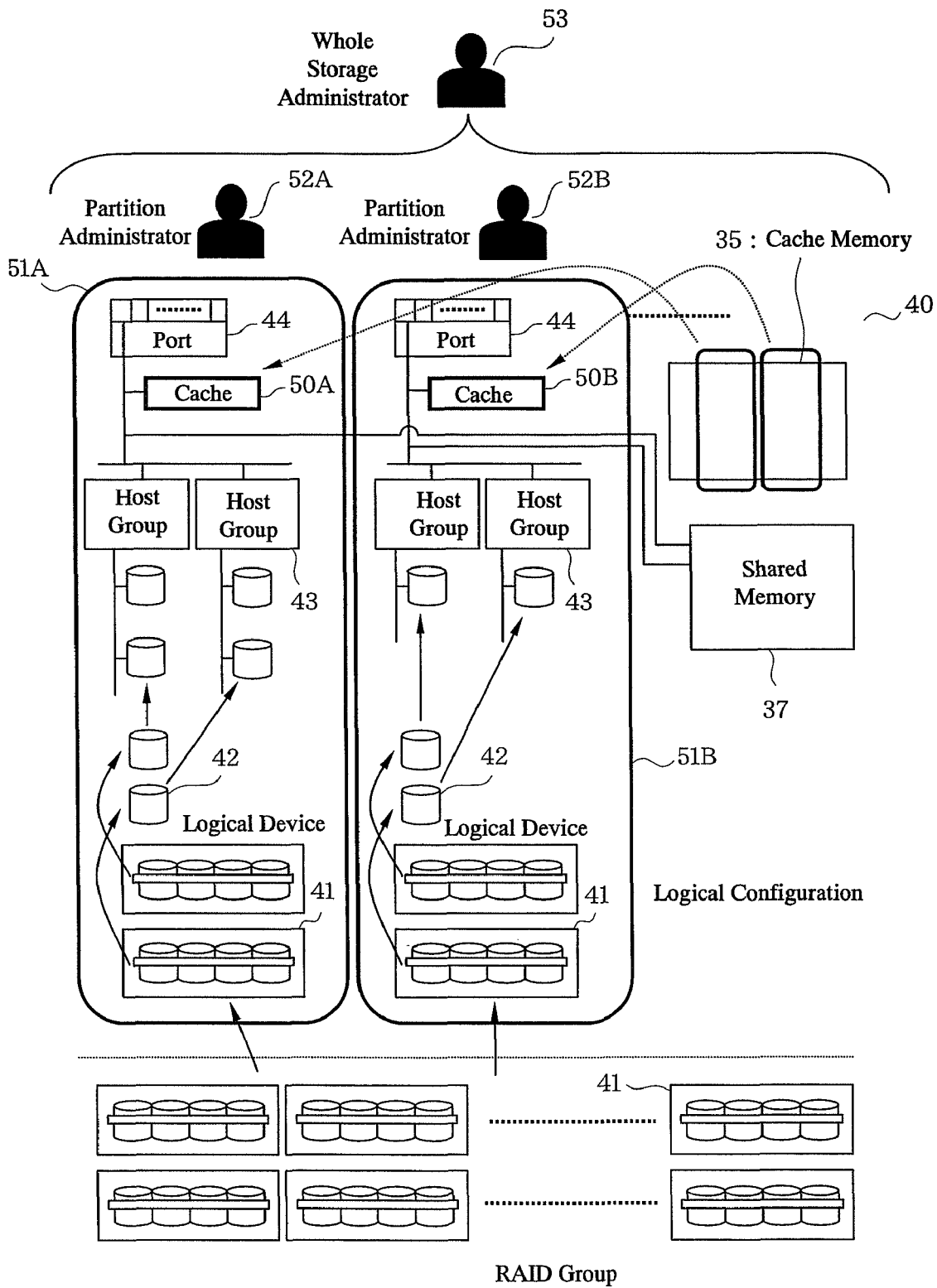
FIG. 4 is an explanatory diagram for showing a concept of a storage logical partition and a cache logical partition related to a storage system that is one embodiment of the present invention.

FIG. 4 is a conceptual diagram of a SLPR 51 {51A, 51B} and a CLPR 50 {50A, 50B}, both of which are logical partitions. The SLPR 51 is a partition for a logical area of a storage configuration such as a connection configuration or an assignment configuration of logical device 42 when the transfer-destination storage unit 110 is actually used from a side of the task server 130 or an assignment configuration of logical device 42. The CLPR 50 is a partition to logically distribute the cache memory 35 area used as a shared area and used as a split cache. For the logical partition system, it is established as the CLPR 50 independent to the cache configuration. By providing the CLPR 50, an access configuration dedicated to the cache area and others will be enabled.

Now, a description will be made of the outline of the logical partition. As the size and the capacity of the storage unit increase, a mode to use one storage unit by a plurality of operating systems has been adopted. However, it has become increasingly difficult for an administrator to understand the operation mode of a plurality of operating systems, increase and decrease the settings, and vary the configuration and others in the storage unit in accordance with the operation mode. The multiple operating systems support, for example, multiple points, groups, applications, and others.

Meanwhile, if the administrator of each system in the multiple operating systems is allowed to change the configuration of the storage unit, in the event that the administrator who controls a certain system intends to change the configuration of the storage unit, the administrator mistakenly changes the area in which other system is used or adverse influences on other systems occur. In addition, in the resources such as cache memories which multiple operating systems share in the storage unit, the system is affected by a processing load of the other systems due to access competition to the resource shared by each system.

Therefore, the logical partition function is introduced, each resource and area which the multiple operating systems use are logically divided to configure a logical partition, and a configuration of carrying out access restriction in each logical partition is adopted. In a specific logical partition, by allowing only a specific administrator to carry out an operation and control such as a setting change and others, it becomes possible to operate its own environment without being affected by the other systems with which the storage unit is shared. Note that the specific administrator, in actuality, indicates an assigned account for the administrator. The transfer-destination storage unit 110 is equipped with the logical partition function as described above.

FIG. 4 shows the condition in which, for example, two SLPRs 51A and 51B are defined as one SLPR 51 in the logical configuration 40. For each of the SLPRs 51A and 51B, one or more out of many RAID groups 41 controlled by the storage unit 10 are assigned. In addition, to each of the SLPRs 51A, 51B, one or more ports 44 to be used are assigned. From the area of the cache memory 35, the specified capacity secured and the CLPRs 50A, 50B are cut out and are assigned to the SLPRs 51A, 51B, respectively.

The setting work of the above-mentioned SLPR 51 and CLPR 50 is able to be implemented by the whole storage administrator 53, that is, by a user account which can operate the whole storage unit. Furthermore, the whole storage administrator 53 sets and assigns the partition controllers 52A, 52B, that is, user accounts which can control the logical partition with respect to the SLPRs 51A, 51B including the CLPRs 50A, SOB, respectively. By these settings, the partition administrator 52A is enabled for definition and change of the connection path configuration as a logical configuration within a scope of the SLPR 51A including the CLPR 50A only and operating and control work such as assignment and change of the logical device 42 within a scope of the RAID group 41 given. The same is applied to the partition administrator 52B. The partition administrators 52A, 52B become administrators of each system in multiple operating systems.

By the logical partition configuration, the partition administrator 52A in one system has all the operations such as reference, setting change, and others to the SLPR 51B in the other system and resources outside the logical partition restricted and disabled. In the similar manner, the partition administrator 52B is allowed for operation and control within the range of the SLPR 51B only including the CLPR SOB, and has all the operations of reference and setting change of resources outside the SLPR 51A and the logical partition restricted and disabled.

With respect to the CLPRs 50A, SOB, because each of them occupies the area of each cache memory 35, they are not subject to detrimental effects such as access load and interference of other logical partitions and from the outside of logical partitions. By this, the user who uses the logical partition is enabled for operation and control as if each one is assigned with an individual storage unit.

<Storage Control Server>

Figure 5:
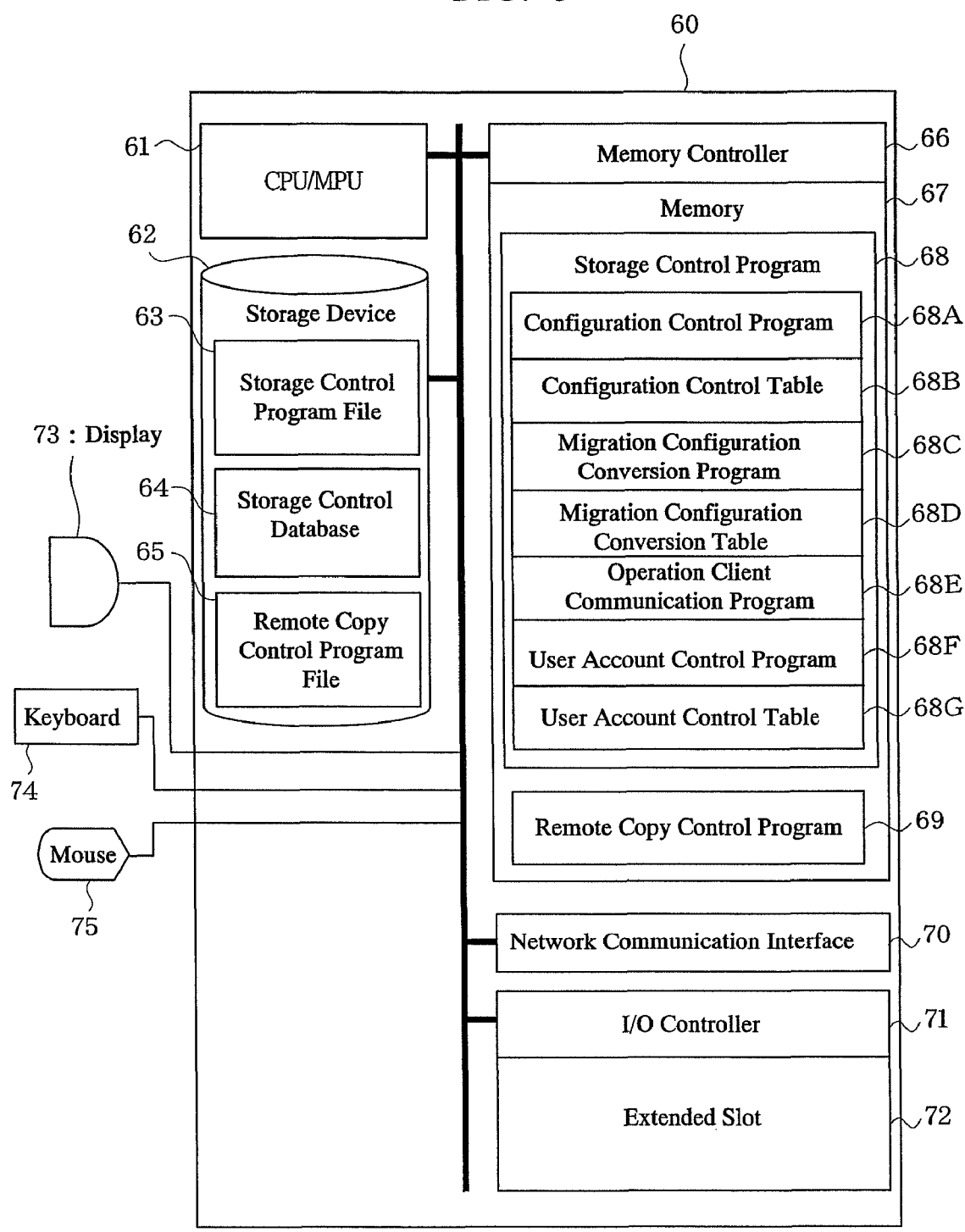
FIG. 5 is a diagram showing a configuration of a storage control server configuring a storage system that is one embodiment of the present invention.

FIG. 5 is a block diagram of a configuration of storage control server 60. The storage control server 60 is not limited to the server form as shown in the present specifications but may be considered as a host computer expressed as, for example, personal computer, workstation, mainframe computer, and others.

The storage control server 60 comprises central processing unit (CPU/MPU) 61, storage device 62, memory controller 66 and memory 67, network communication interface 70, I/O controller (extension bus) 71 and extension slot 72, display 73, keyboard 74, mouse 75 and others.

The storage device 62 is a hard disk drive and others, in which storage control program file 63, control DB 64, remote copy control program file 65 and others are stored. The network communication interface 69 carries out communication processing on the network 300. In the I/O controller 71 and the extension slot 72, various kinds of I/O units are controlled. The display 73, keyboard 74, mouse 75, and others are used when the storage control server 60 is directly operated and configuration control, migration processing, and other setting processing, are implemented.

By the execution of the storage control program file 63, a storage control program 68 is loaded on memory 67. By executing the remote copy control program file 65, a remote copy control program 69 is loaded on memory 67. The central processing unit 61 operates in accordance with each program on memory 67 to carry out processing related to configuration control and migration.

The storage control program 68 more specifically comprises a configuration control program 68A, a configuration control table 68B, a migration configuration conversion program 68C, a migration configuration conversion table 68D, an operation client communication table 68E, an user account control program 68F, and a user account control table 68G. Each piece of table information such as configuration control table 68B and others which are controlled by the storage control program 68 and control information such as system information and others are stored in the control DB 64 and controlled. In the user account control by the user account control program 68F, controls for controllers such as the whole storage administrator 53, partition administrators 52A, 52B, and others should be included as users.

<Operation Client>

Figure 6:
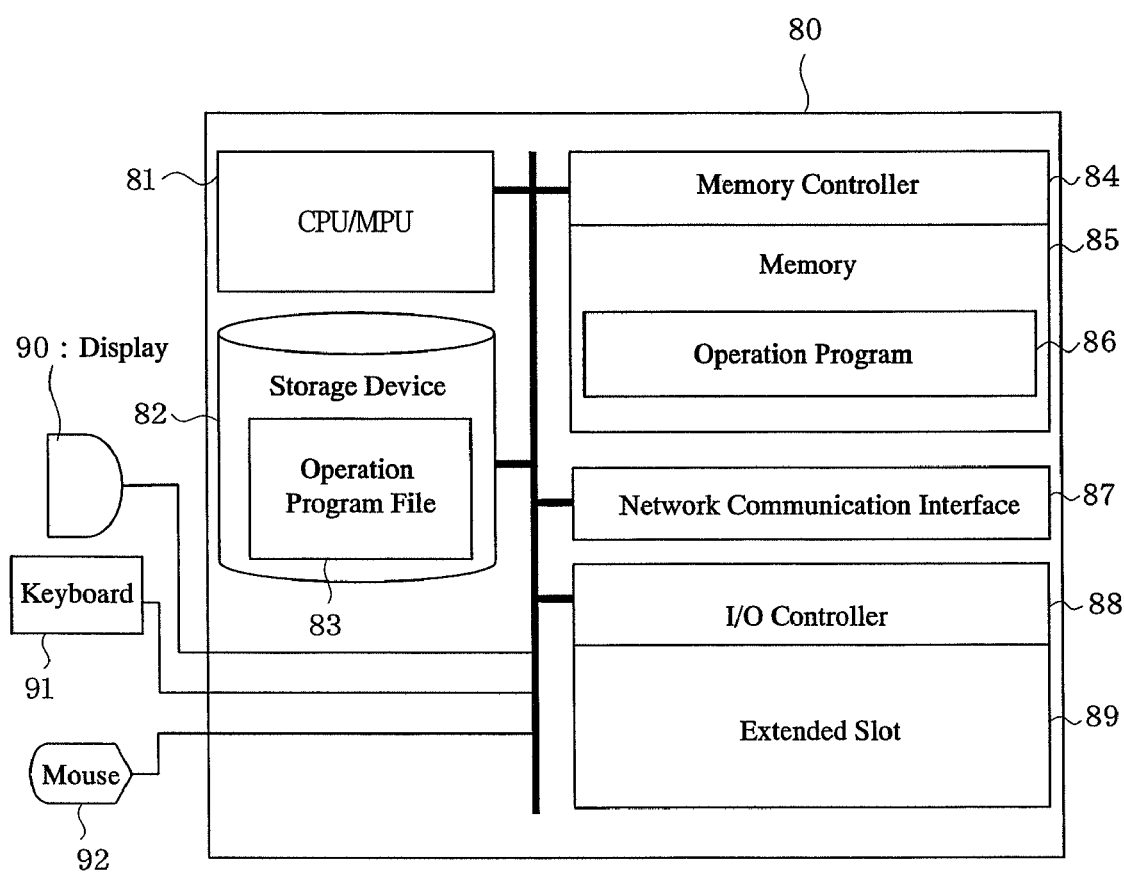
FIG. 6 is a diagram showing a configuration of an operation client configuring a storage system that is one embodiment of the present invention.

FIG. 6 is a block diagram that indicates the configuration of the operation client 80. The operation client 80 is called a client in the present specifications, but for example, it may be considered as a host computer expressed as a server, personal computer, workstation, main frame computer, and others.

The operation client 80 comprises a central processing unit (CPU/MPU) 81, a storage device 82, a memory controller 84 and a memory 85, a network communication interface 87, an I/O controller (extension bus) 88 and an extended slot 89, a display 90, a keyboard 91, a mouse 92, and others.

To the storage device 82, the operation program file 83 is stored, and by executing the present file, the operation program 86 is loaded on the memory 85. The central processing unit 81 carries out processing related to configuration control and migration by operating in accordance with the operation program 86 on the memory 85. The network communication interface 87 carries out communication processing on the network 300. In the I/O controller 88 and the extended slot 89, various kinds of I/O units are controlled. The display 73, the keyboard 74, the mouse 75, and others are used by the whole storage administrator 53 to implement processing of configuration control and migration and operations for other setting processing, and others.

<Configuration and Processing Related to Migration Control>

Figure 7:
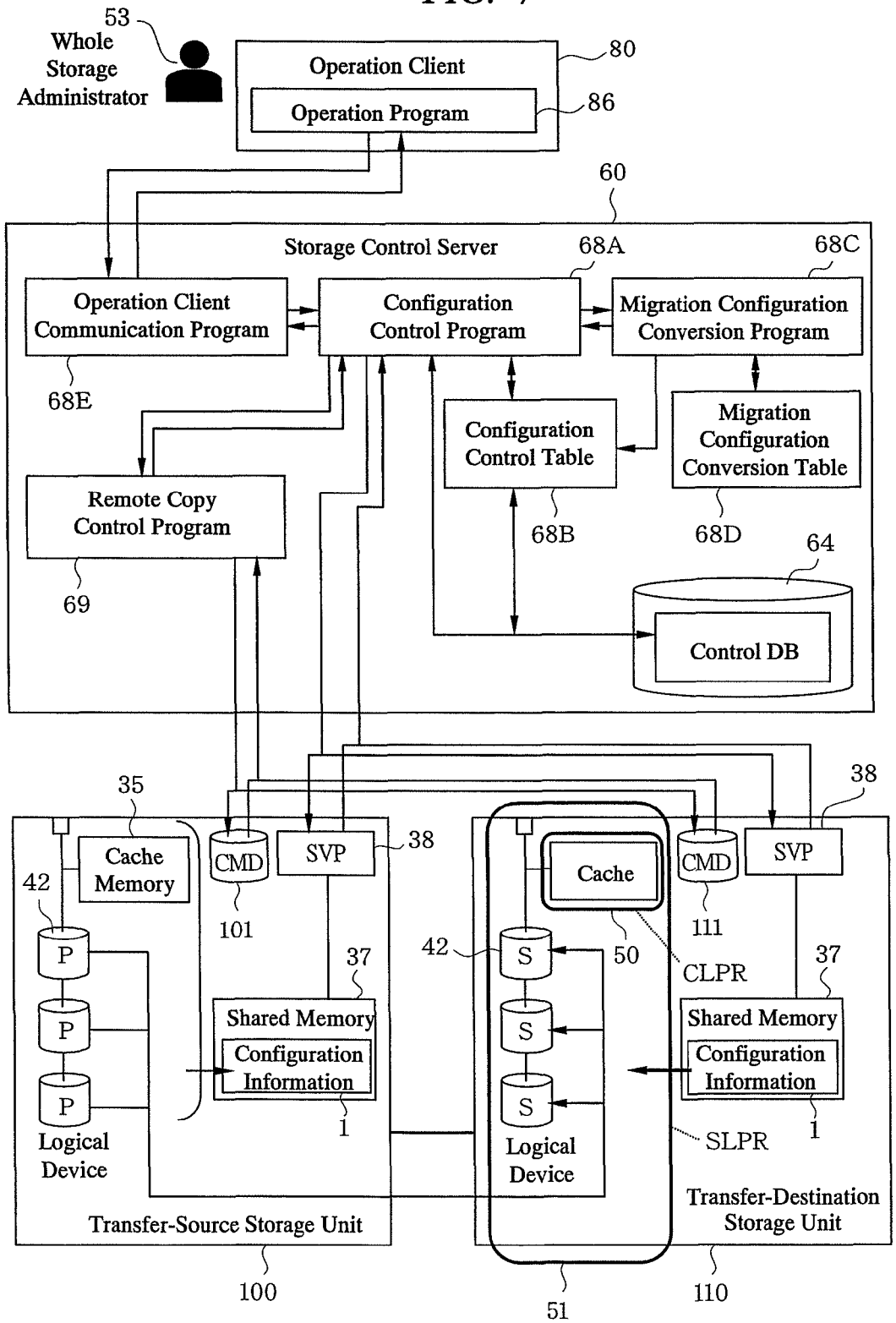
FIG. 7 is a diagram showing a correlation between a system configuration associated with a configuration and migration control of data and a processing/operation in a storage system that is one embodiment of the present invention.

FIG. 7 shows a block configuration related to migration control of a configuration and data and the correlation between a process and an operation. The transfer-source storage unit 100 (corresponds to the reference numeral "100A", "100B"), the transfer-destination storage unit 110, the storage control server 60, and the operation client 80 are connected by the above-mentioned communication means. The whole storage administrator 53 operates the operation client 80 and carries out the operation related to migration of configuration and data.

The transfer-source storage unit 100 and the transfer-destination storage unit 110 are logically formed with, for example, the SVP 38 described above, the shared memory 37, the cache memory 35, the logical device 42, the CMD devices 101, 111, and others, and the transfer-destination storage unit 110 is equipped with a logical partition function which comprises the logical partition such as the SLPR 51 and the CLPR 50.

In each of the transfer-source and the transfer-destination storage units (100, 110), the configuration information 1 including the logical configuration controls on shard memory 37. The storage control server 60 collects the configuration information 1, which is the control information, by the configuration control program 68A via the SVP 38 of each storage unit (100, 110) and stores each of acquired configuration information 1 in the configuration control table 68B. The configuration control table 68B is controlled in the control DB 64.

With the configuration of each storage unit (100, 110) controlled as described above, the whole storage administrator 53 gives directions of migration processing to the storage control server 60 by the use of the operation program 86 which operates on the operation client 80. In the present direction, the transfer-source and the transfer-destination designations are included. The storage control server 60 receives the directions from the operation program 86 by the operation client communication program 68E and when it receives the direction, the storage control server 60 handles the directions to the configuration control program 68A.

When the configuration control program 68A receives the migration processing directions, the program judges it not as a regular storage unit operation/running process but a migration process to the logical partition configuration, and requests the migration configuration conversion program 68C to carry out the conversion process for setting parameters about the configuration information 1 for migration. Note that, in the event that the direction from a side of the operation client 80 is a direction of the operation/running process of the regular storage unit, the process is carried out by the configuration control program 68A.

The migration configuration conversion program 68C converts the configuration information 1 of the transfer-source storage unit 100 which is controlled by the configuration control table 68B into the setting parameters necessary for a migration process to the logical partition configuration by using the migration configuration conversion table 68D in response to the request. After the conversion, the migration configuration conversion program 68C directly rewrites the configuration information 1 of the area of the relevant transfer-destination storage unit 110 in the configuration control table 68B with the setting parameters prepared by conversion used as the setting update information for the transfer-destination storage unit 110 and notifies the configuration control program 68A of completion of processing. The setting update information is the information used for updating the setting concerning the configuration of the transfer-destination storage unit 110, that is, the configuration information 1C. In the setting update information, there included is the logical partition information established by the conversion processing, that is, the logical configuration information that supports the configuration in which the transfer-source logical configuration with no logical partition is converted to the transfer-destination logical partition configuration of the SLPR 51 and others.

Figures 9, 10:
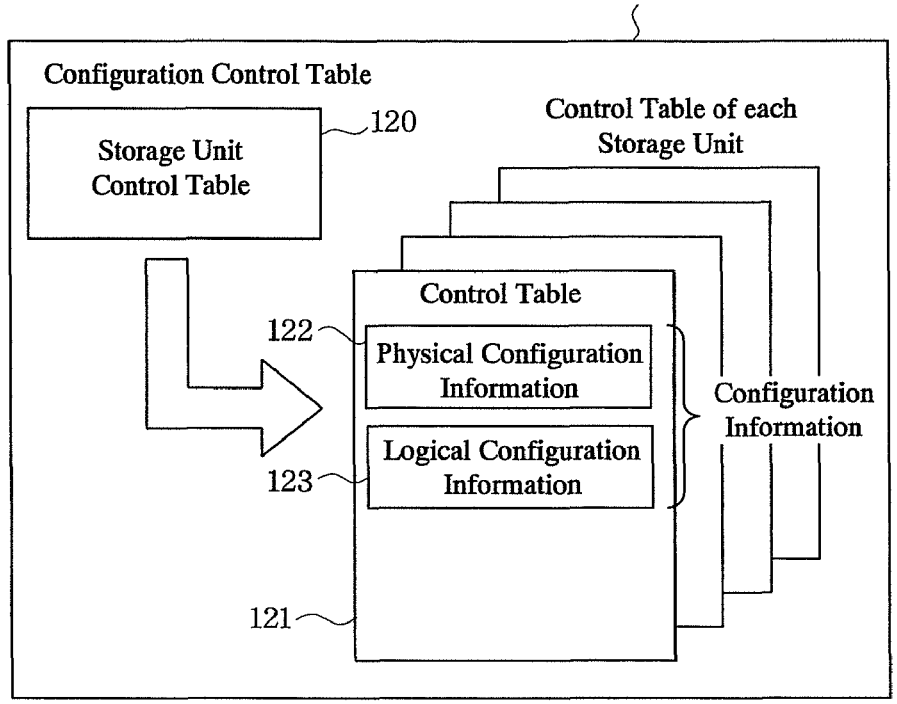
FIG. 9 is a diagram showing details of a configuration control table in a storage system that is one embodiment of the present invention.
FIG. 10 is a diagram showing details of a storage-unit control table in a storage system that is one embodiment of the present invention.

FIG. 9 indicates the configuration of the configuration control table 68B. The configuration control table 68B processes the configuration information by the control table for each storage unit. In addition, the migration configuration conversion table 68D is prepared in accordance with each piece of configuration information 1 in the configuration control table 68B. That is, in accordance with the configuration of the storage unit 10, the construction of each piece of configuration information 1 varies, and with the difference reflected, the migration configuration conversion table 68D is prepared.

The configuration control program 68A carries out the setting update processing of the logical configuration of the relevant transfer-destination storage unit 110 in accordance with the content of the configuration information 1 of the relevant transfer-destination storage unit 110, that is, the setting update information, which is updated by the conversion in the configuration control table 68D. That is, the configuration control program 68A transmits the setting update information for updating the configuration information 1 on shared memory 37 to the transfer-destination storage unit 110, and by this information, the configuration information 1 on shared memory 37 is updated. Because in the setting update information, the logical partition information is included, by updating at the transfer-destination it is possible to update the configuration to the logical configuration which adopts the logical partition configuration.

The configuration control program 68A detects the remote copy configuration between the transfer-source storage unit 100 and the transfer-destination storage unit 110 from the current configuration information 1 of each storage unit 10 in the configuration control table 68B when migration of the configuration to the transfer-destination logical partition by the above-mentioned processing and requests the remote copy control program 69 to carry out a remote copy between logical devices which achieve one-to-one association between the transfer-source and the transfer-destination The remote copy configuration is a configuration such as communication route and others established to copy data between the copy-source logical device and the copy-destination logical device. In FIG. 7, reference symbol P denotes the copy-source (primary) logical device in remote copying, and reference symbol S denotes the copy-destination (secondary) logical device. When remote copying is carried out, in the preceding stage, between the copy-source logical device P and the copy-destination logical device S, communication routes for copy data transmission for remote copy, that is, between the ports, such as communication routes 210A, 210B, have been established. In addition, communication routes for remote copy control with the CMD devices 101, 111 in each storage unit 10, such as the communication routes 200A, 200B, 200C, have been established.

The remote control program 69 carries out remote copy control to the CMD devices 101, 111 to actually carry out data copying between logical devices, and when this copy processing is completed, notifies the effect to the configuration control program 68A.

The configuration control program 68A requests the operation client communication program 68E to notify the processing completion to the operation program 86 when migration of the configuration and migration of the stored data to the transfer-destination logical partition are completed by the above processing. And the operation client communication program 68E notifies the operation program 86 of the operation client 80 of the completion of migration processing of the configuration and the data based on the directions. The whole storage administrator 53 who uses the operation client 80 understands the completion of migration processing by the notice.

<Flow of Migration Processing>

Figure 8:
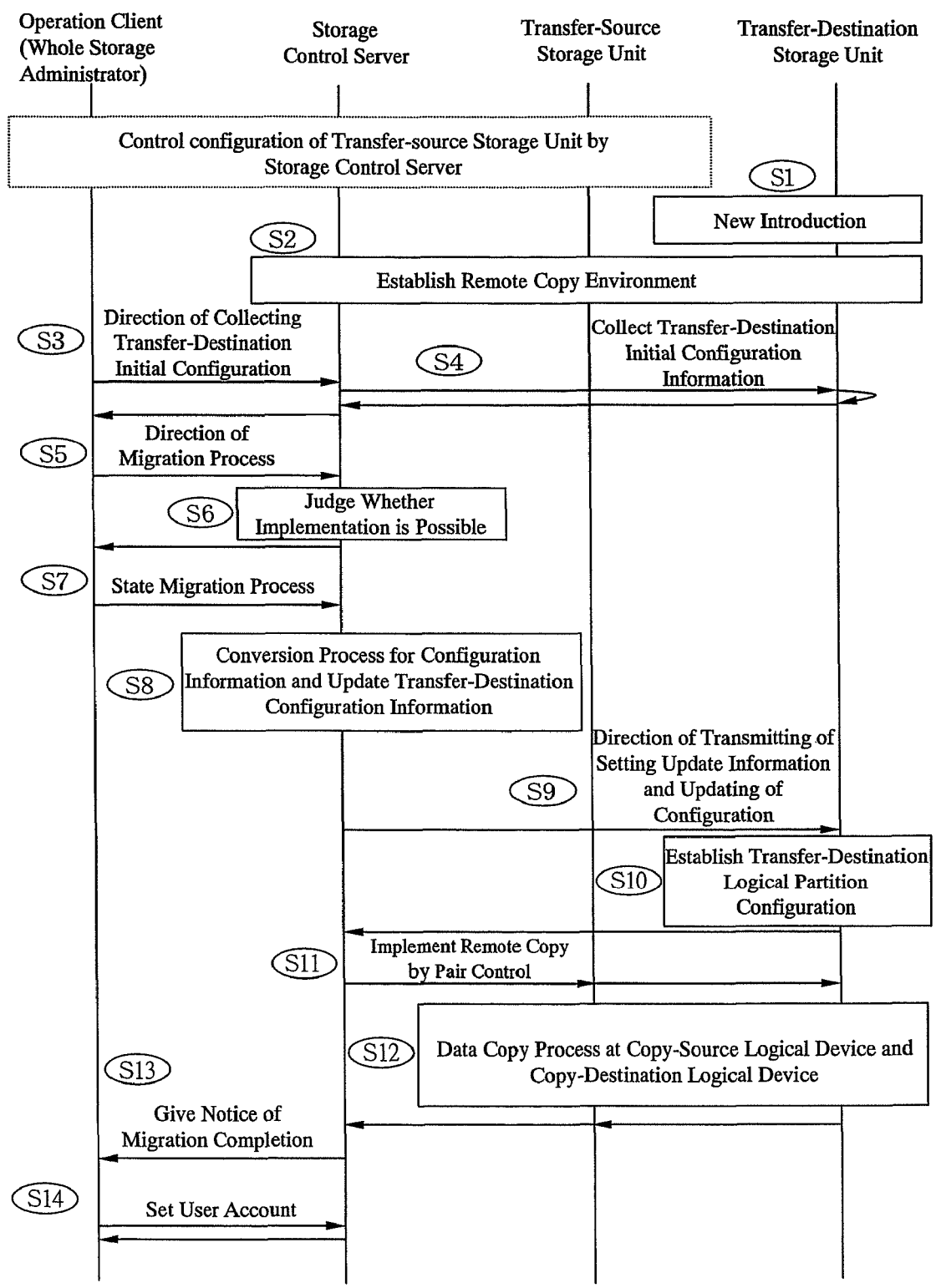
FIG. 8 is a processing time chart in a storage system that is one embodiment of the present invention.

FIG. 8 is a time chart that indicates correlation of each processing unit and flow of processing related to FIG. 7. As a processing flow, first of all, as the prerequisite condition, the configuration of the transfer-source storage unit 100 is controlled by the storage control server 60. That is, the storage control server 60 collects the configuration information 1 from the transfer-source storage unit 100 from time to time and stores the latest configuration information 1 in the configuration control table 68B in the control DB 64.

In procedure S1, to an existing storage system, the transfer-destination storage unit 110 which has a logical partition function is newly introduced and installed. The transfer-destination storage unit 110 is connected to the network 300.

In procedure S2, the whole storage administrator 53 is intervened and carries out remote copy environment creation work in advance. In this operation, the whole storage administrator 53 installs and sets hardware so that remote copying by the remote copy function is ready to be carried out between the transfer-source storage unit 100 and the transfer-destination storage unit 110. For example, the communication cable is connected across ports of each of the transfer-source and the transfer-destination storage units 100, 110 and setting of connection paths and others is carried out to secure the communication routes 210A, 210B for remote copying. In addition, by connecting the storage control server 60 to ports of each of the transfer-source and the transfer-destination storage units 100, 110 by the communication cable to set connection paths and others, CMD device 101, 111 and communication routes 200A, 200B, and 200C for remote copy control are secured. The present operation may be of the processing form implemented at the timing other than this. For example, at the timing in which the remote copy environment creation is required, the direction is outputted to the operation client 80, and the whole storage administrator 53 is prompted to carry out the operation to create the remote copy environment.

By procedure S3, the operation client 80 directs the storage control server 60 to collect the initial configuration after the new introduction with the transfer-destination storage 110 kept under control by the storage control server 60. By the way, such a mode may be adopted that the storage control server 60 collects and acquires the latest configuration information 1 of the transfer-source storage unit 100 at the timing same as that for collecting the configuration information 1 of the transfer-destination storage unit 110.

By procedure S4, based on the direction, the storage control server 60 collects various kinds of control information including the configuration information 1 stored in shared memory 37 of the transfer-destination storage unit 110 via the SVP 38 on the network 300. By the execution of procedure S4, the storage control server 60 understands the configuration of each of the transfer-source and the transfer-destination storage unit 100, 110 and responds the effect to the operation client 80.

With each configuration information 1 of the transfer-source and the transfer-destination storage units 100, 110 acquired by the storage control server 60, by procedure S5, the whole storage administrator 53 selects and designates the target transfer-source storage unit 100 and the transfer-destination storage unit 110 and directs from the operation client 80 to the storage control server 60 to carry out migration processing.

In procedure S6, the storage control server 60 compares designated resources of the transfer-source and the transfer-destination storage units 100, 110, and judges whether or not the configuration of the transfer-source storage unit 100 is able to be moved to the transfer-destination storage unit 110. That is, the storage control server 60 confirms resources such as ports, cache, logical device, and others by referring to the configuration control table 68B and judges whether the transfer-source logical configuration can be moved to the configuration of the logical partition of the transfer-destination SLPR 51 and others in accordance with the designation. In the vent that the storage control server judges it possible to carry out the migration based on the designation from the whole storage administrator 53, the next processing can be implemented, and the storage control server notifies the response of the effect to the operation client 80. In addition, if it is judged impossible to carry out migration based on the designation, the error information to the effect that "the migration based on the designation is impossible" is notified to the operation client 80. By the way, in this process, the case in which migration to the designated logical partition configuration is carried out in accordance with the direction from the operation client 80 is discussed, but a mode to carry out migration to the configuration close to that directed even if the migration to the logical partition configuration as directed is impossible may be adopted.

By procedure S7, the operation client 80 continually carries out the migration processing in accordance with the response from the storage control server 60. For example, when the designated migration is able to be implemented, the subsequent processing, that is, configuration migration processing is automatically started. Or, the results of the judgment of S6 are displayed at the operation client 80 so that the whole storage administrator 53 is allowed to confirm that the designated migration is ready to be carried out. And at the operation client 80, the input of direction to start migration processing by the whole storage administrator is received, and when the direction is entered, the direction is transmitted to the storage control server 60, and configuration migration processing is started. Or after the adequacy of migration is judged in accordance with the direction of migration processing at the storage control server 60, if migration is possible, migration processing is automatically started.

By procedure S8, the storage control server 60 carries out configuration information 1 conversion processing for configuration migration and processing to update the configuration information 1 of the transfer-destination storage unit 110 in the configuration control table 68B. By the migration configuration conversion program 68C and others, the configuration information 1 of the transfer-source storage unit 100 is converted to the configuration information 1 that corresponds to the SLPR 51 and the CLPR 50 of the transfer-destination storage unit 110 and the information prepared by the conversion is updated as the configuration information 1 of the transfer-destination storage unit 110. To the portion of the configuration information 1 of the transfer-destination storage unit 110 in the configuration control table 68B, the information prepared by the conversion is written.

By procedure S9, based on the conversion processing and updating of configuration control table 68B, the storage control server 60 transmits the setting update information to update the configuration of the transfer-destination storage unit 110 to the transfer-destination storage unit 110, and updating of the transfer-destination logical configuration is thereby directed.

By procedure S10, based on the setting update information received from the storage control server 60 at the transfer-destination storage unit 110, updating the configuration information 1 on the shared memory 37 via the SVP 38, updating processing to the logical configuration including the logical partition configuration is carried out. By this update processing, the new logical partition configuration in the transfer-destination storage unit 110 is established. After updating processing, update completion is notified from the transfer-destination storage unit 110 to the storage control server 60.

After completion of updating of the transfer-destination configuration, if the remote copy environment creation of S2 is finished, the next data migration processing is automatically started.

By procedures S11 and S12, remote copy processing is carried out for the data of the logical device subject to migration between the transfer-source storage unit 100 and the transfer-destination storage unit 110. By procedure S111, the remote copy control program 69 of the storage control server 60 directs the CMD devices 101, 111 of each of the transfer-source and the transfer-destination storage units 100, 110 to carry out remote copy processing by pair control between logical devices of the transfer-source and the transfer-destination storage units 100, 110 subject to data migration.

By procedure S12, based on the direction received by CMD devices 101, 111 of each of the storage units 100, 110, remote copy processing corresponding to the direction is carried out between controllers. Data copy processing is carried out between controllers of storage units 100, 110 with the logical device subject to data migration of the transfer-source storage unit 100 designated as the copy-transfer-source logical device P and the logical device assigned by the logical partition configuration of the transfer-destination storage unit 110 uniquely associated with is designated as copy-transfer-destination logical device S. When remote copy processing in multiple logical devices subject to data migration is completed, the data migration completion is notified to the storage control server 60.

By procedure S13, the storage control server 60 notifies the operation client 80 of the completion of migration processing for the configuration and stored data. By this, at the operation client 80, the whole storage administrator 53 understands that the migration of configuration and data has been completed.

Thereafter, by procedure S14, the whole storage administrator 53 operates the operation client 80 and sets the user account resulting from the migration of configuration to the storage control server 60. The user account control program 68F of the storage control server 60 carries out the setting to the user account control table 68G. By this setting, registration of user account for each administrator to be set for each logical partition in the logical partition configuration of the transfer-destination storage unit 110 after completion of migration, that is, the SLPR 51 or CLPR 50 with each transfer-source logical partition reflected is carried out, or change and updating to the existing user account are carried out. For example, in the event that the administrator of each transfer-source storage unit 100 before migration is set as a administrator for each logical partition in the transfer-destination storage unit as it is, as shown in FIG. 4, individual administrator is set as is the case of partition administrators 52A, 52B for each logical partition.

Now, brief explanation will be made on the pair control in the remote copy control by the remote copy function, which is a conventional technology. In the remote copy function, let the storage volume which is the copy processing unit be, for example, a logical device. The copy-transfer-source logical device P and the copy-transfer-destination logical device S are set as a copy pair. As the state transition of the copy pair, the condition in which the data of the copy-transfer-source logical device P is not at all reflected to the copy-transfer-destination logical device S because the copy-pair relation is cancelled is expressed as the pair cancelled state. It is expressed as pair generation to establish the copy pair from the pair cancelled state and to implement the initial overall copy from the copy-transfer-source logical device P to the copy-transfer-destination logical device S. The state in which the initial overall copy is completed and the data updated by the copy-transfer-source logical device P is reflected in synchronism with the copy-transfer-destination logical device S is expressed as the pair synchronous state. It is expressed as pair division to temporarily cancel the synchronous state only from the pair synchronous state with the copy-pair relation maintained. The state of copy pair with the synchronous state only temporarily cancelled by pair division is expressed as the pair divided state. In the pair divided state, the update data of the copy-transfer-source logical device P is not reflected to the copy-transfer-destination logical device S but the difference from the copy-to data by copy-transfer-source updating is differential-controlled. It is expressed as pair-re-synchronism to return from the pair-divided state to the pair synchronous state. In the event that pair-re-synchronism is implemented from the pair divided state to the pair synchronous state, the logical device data is entirely copied but the updated differential of the copy-transfer-source logical device P is copied to the copy-transfer-destination logical device S to achieve the synchronous state. By completely canceling the relation of copy pair is expressed as pair cancellation. In the present remote copy function, multiple logical devices can be simultaneously handled.

<Control Information>

FIGS. 9 through 14 are diagrams to explain the control information which the storage control server 60 has for the configuration control and migration control. FIG. 9 indicates the detailed content of the configuration control table 68B in the storage control server 60. The configuration control table 68B comprises a storage unit control table 120 and control table 121 of each storage unit 10. The storage unit control table 120 controls the storage unit itself under the control of the storage control serve 60 and comprises the control table 121 of each storage unit 10. In each control table 121, the configuration information 1 obtained from the storage unit 10 is controlled. Because in each storage unit 10, the configuration information 1 is held on shared memory 37, in each control table 121, the copy is stored. In the case of FIG. 2, the storage unit control table 120 comprises a control table 121 which stores each copy of configuration information 1A, 1B of the transfer-source storage units 100A, 100B and a control table 121 which stores copy of configuration information 1C of the transfer-destination storage unit 110. In each control table 121, as the configuration information 1, two kinds of information, namely, physical configuration 122 to carry out physical configuration control and logical configuration information 123 to carry out logical configuration control are further controlled.

FIG. 10 indicates a configuration example of the storage unit control table 120. The storage unit control table 120 comprises, for example, items of control No., storage unit ID, storage unit name, control table address, presence or absence of logical partition function. A control Number is "ID" (identification information) such as a serial Number to identify each storage unit 10 in the whole storage system. The storage unit name is the name assigned to each storage unit 10 on the storage control server 60. Control table address is an address that is used to refer from the storage unit control table 120 to each control table 121. Presence or absence of logical partition function is the information to discriminate between presence and absence of the logical partition function to be equipped to the transfer-destination storage 110.

In the storage control server 60, when the storage unit 10 to be operated is chosen from the storage unit control table 120, the control table 121 is detected by the use of the corresponding control table address. Each control table 121 is arranged in the storage unit control table 120 for each storage unit under the control of the storage control server 60.

For an example, because the transfer-source storage units 100A, 100B do not have any logical partition function, "ABSENCE" information is set to the item of the presence or absence of the logical partition. Because the transfer-destination storage unit 110 has a logical partition function, "PRESENCE" information is set to the item of the presence or absence of the logical partition.

By the way, when the information of the table shown in each figure including the storage unit control table 121 is displayed on the user interface in the operation client 80 or storage control server 60 and others, the display form is the same as the configuration shown in, for example, each figure.

FIG. 11 indicates the content of physical configuration information 122 in the control table 121 more in detail. In the physical configuration information 122, information which enables the association with the hardware-related information and logical information of the storage unit 10 is held. The physical configuration information 122 possesses, for example, storage unit ID, cache capacity, port information, disk information, and others. The cache capacity is the available capacity of the cache memory 35 loaded on the storage unit 10 identified by the storage unit ID. As the port information, it has port ID which is the ID of a physical port which CHA 36 of the storage unit 10 has, information that indicates the use condition, and others. The disk information is the information related to disk drive 32, and contains physical disk ID, capacity, RAID type, use condition, RAID group ID, and others. The physical disk ID is ID of the disk drive 32. The capacity is the capacity of the disk drive 32. The RAID type is the information that indicates the RAID type assigned to the disk drive 32. The use condition is the information that indicates the condition such as whether or hot the disk drive 32 is being used for RAID assignment. The RAID group ID is ID of the RAID group which is assigned to the disk drive 32. As an example, the condition in which four disk drives 32 are assigned with RAID group ID set as 1 and RAID type as 5.

FIG. 12 indicates the content of the logical configuration information 123 in the control table 121 in more detail. In the logical configuration information 123, connection path configuration observed from the connected host computer and assigned logical device ID, and other logical setting information in the storage unit 10 are maintained and controlled. The logical configuration information 123 includes logical partition information, cache information, logical device information, port information, path configuration information and others. For example, as the logical partition information, storage logical partition ID (abbreviated as SLPR-ID), and cache logical partition ID (abbreviated as CLPR-ID). They are IDs of the SLPR 51 and the CLPR 50. In addition, for the cache information, overall cache capacity, assigned capacity, and others are included. The overall cache capacity is the capacity of cache memory 35 which serves as the supply source of the logical partition configuration.

The assigned capacity is the capacity assigned as the cache area to each CLPR 50 of CLPR-ID. The example shows that of 32 GB of the overall cache capacity, 12 GB is assigned to the CLPR 50 identified by the CLPR 1 as the assigned capacity.

In addition, for the logical device information, logical device ID, RAID group, RAID type, capacity, use condition, SLPR-ID, CLPR-ID, and others are held. The logical device ID is the ID to identify and control the logical device 42 cut from the RAID group 41. The RAID group is the information that shows the RAID group 41 set to the logical device ID. The RAID type is the information that indicates the RAID type set to the logical device ID. The capacity is the capacity of the logical device 42. The use condition is the information that shows the use condition in assigning the logical device 42 to the logical partition configuration and others. SLPR-ID and CLPR-ID are ID of the SLPR 51 and the CLPR 50 which are associated with the logical device 42.

In addition, as port information, the port ID and use condition, path configuration information, the SLPR-ID and CLPR-ID, and others are held. To logical ports 44, 44A identified by each port ID, the connection path shown by the path configuration information is assigned and SLPR51 and the CLPR 50 identified by the SLPR-ID or CLPR-ID are assigned.

In addition, as path configuration information, host group, LU No. the logical device ID, CMD definition and others are held. The host group is ID of a host group 43 which uses the connection path. LU No. is the information to identify LU (logical unit) which the host group uses. The logical device ID indicates the logical device assigned to the LU. The CMD definition is the information that indicates the setting ON/OFF to be used as the CMD device as described above.

For an example, by ports 44, 44A of port ID "CL1-A", it shows that host group 43 of host group "Grp 1", logical device 42 of corresponding logical device ID "1," "2," and the SLPR 51 "SLPR 1" and the CLPR 50 "CLPR 1," and others are set.

In addition, in the event that in the control table 121, the relevant storage unit 10 has no logical partition function and the item of presence or absence of logical partition in the storage unit control table 120 is "ABSENCE," for example, information related to logical partition is not used, and by keeping the related item blank, it is possible to control the transfer-source storage unit 100 and others which have no logical partition function.

FIG. 13 indicates the content of the migration configuration conversion table 68D in the storage control server 60 more in detail. The configuration example that corresponds to the transfer-source storage unit 100 and the transfer-destination storage unit 110 is shown. The migration configuration conversion table 68D is prepared and used in the case of conversion processing to convert the configuration of the transfer-source storage unit 100 to the logical partition configuration of the transfer-destination storage unit 110. The migration configuration conversion program 68D has an area of the transfer-source configuration information shown on the upper side and an area of the transfer-destination configuration information shown on the lower side. The migration configuration conversion table 68D is prepared by the storage control server 60 on the basis of the configuration information 1 of each of the transfer-source and the transfer-destination storage units 10.

In the area of the transfer-source configuration information, the transfer-source storage unit ID, the transfer-source cache capacity, port information, configuration information corresponding to the port and others are held. For the configuration information corresponding to the port, host group, LU No., logical device ID, capacity, RAID type, CMD definition, and others are held. The transfer-source storage unit ID is the ID of the transfer-source storage unit 100. The transfer-source cache capacity is the cache capacity of the transfer-source storage unit 100. For the port information, used port ID and use condition are information on the port used in the transfer-source storage unit 100. The configuration information corresponding to the port information is information on the connection path configuration and others set to the port. Each piece of information of the host group and others corresponding to the port information is same as the information described in the logical configuration information 123.

In the area of the transfer-destination configuration information, the transfer-destination storage unit ID, set SLPR-ID, set CLPR-ID, set CLPR assigned capacity, applicable port ID and presence or absence of use and other port information, the transfer-destination applicable configuration information that corresponds to port information and others are held. The transfer-destination storage unit ID is associated with the transfer-source storage unit ID. The set SLPR-ID and set CLPR-ID indicates each logical partition ID set as the SLPR 51 and the CLPR 50 in the transfer-destination storage unit 110. The set CLPR assigned capacity indicates the capacity assigned as the cache area by the CLPR 50 to be set. The applicable port ID indicates the port to be applied at the transfer-destination to the use port ID at the transfer-source presence or absence of use indicates whether or not the applicable port is used. The transfer-destination applicable configuration information indicates the configuration information applied in correspondence to the applicable port at the transfer-destination The transfer-destination applicable configuration information has in the same manner, host group, LU Number, logical device ID, capacity, RAID type, CMD definition, and others.

When conversion processing by the migration configuration conversion program 68C is implemented, first of all, in order to reflect the information necessary for migration of the transfer-source storage unit 100 to the area of the transfer-source configuration information in the migration configuration conversion table 68D, updating processing of the area of the transfer-source configuration information is carried out on the basis of the reference of the configuration control table 68B. That is, by the storage control server 60, the control table address which serves as the reference party that corresponds to the transfer-source storage unit 100 is acquired from the storage unit control table 120 and the control table 121 that corresponds to this is detected, and referring to the configuration information 1 in this control table 121, that is, the physical configuration information 122 and the logical configuration information 123, by this configuration information 1, the area of the transfer-source configuration information of the migration configuration conversion table 68D is updated. By the updating, the information becomes the state of the transfer-source configuration information as shown in, for example, FIG. 13.

In the conversion processing, in the transfer-destination configuration information of migration configuration conversion table 68D, based on the content of the transfer-source configuration information, the transfer-source storage ID is substituted and converted to the set SLPR-ID and the transfer-source cache capacity to the set CLPR-ID and the set CLPR assigned capacity. In the event of converting from the transfer-source to the transfer-destination with respect to the connection path configuration, related to port configuration, logical device configuration and other various resources, even if the ID exactly same as the transfer-source ID is unable to be secured, as far as the resources that can functionally actualize the same configuration can be secured, the resource is assigned. The transfer-destination configuration information in this kind of migration configuration conversion table 68D is used for the set update information for updating the transfer-destination In the migration configuration conversion table 68D shown in FIG. 13, as an example, the transfer-destination storage unit ID "11100A" is set as the migration-to for the transfer-source storage unit ID "00100A." In addition, it indicates that the configuration of the transfer-source storage unit 100 is migrated to the configuration of the SLPR 51 "SLPR 1" and the CLPR 50 "CLPR 1" in the transfer-destination storage unit 110. In addition, in the CLPR 50 "CLPR 1," it indicates that the 12 GB capacity is assigned. In addition, for example, it indicates that the configuration of port "CL1-A" used at the migration-from is migrated to the configuration of the transfer-destination applied port "CL2-E." In this migration of port configuration, it indicates that each setting such as host group "Grp 1," "LU No. "0," "1," 36 GB capacity, RAID type "5," CMD definition and others is not changed and taken over as it is, and the logical device ID is varied by the setting of the logical device 42.

When the configuration information 1 including the logical partition configuration in the transfer-destination storage unit 110 is established as the transfer-destination configuration information in the migration configuration conversion table 68D by the conversion processing in the storage control server 60, by this information, first of all, the content of the logical configuration information 123 in the control table 121 that corresponds to the relevant transfer-destination storage unit 110 is updated. And when the storage control server 60 updates the content of the control table 121 that correspond to the relevant transfer-destination storage unit 110, the information is transmitted to the transfer-destination storage unit 110 with this information used as the setting update information, and by this information, the configuration is updated.

By the way, because on the stage after the conversion processing, actual updating of the setting has not yet been carried out in the transfer-destination storage unit 110, it is the state in which the content of the transfer-destination configuration information of the migration configuration conversion table 68D does not coincide with the content of the configuration information 1C of the transfer-destination storage unit 110. When the setting updating is carried out normally in the transfer-destination storage unit 110, there achieved is the state in which the content of the transfer-destination configuration information of the migration configuration conversion table 68D coincides with the content of the configuration information 1C of the transfer-destination storage unit 110.

As described above, by the migration configuration conversion program 68C of the storage control server 60, in the migration configuration conversion table 68D, there carried out is the conversion to read the configuration content through software from the transfer-source configuration information 1, for example, configuration information 1A, to the transfer-destination configuration information 1, for example, configuration information 1C. The relevant conversion is basically carried out by reading and comparing the transfer-source configuration information 1 with the transfer-destination configuration information 1. To achieve conversion between configuration information 1 with different constructions, in the storage control server 60, the association information to read items (attributes) comprising the configuration information 1 is set, and the information is referred at the time of the conversion processing, and reading processing may be carried out.

FIG. 14 indicates more detailed content of the user account control table 68G in the storage control server 60. The user account control table 68G has user account, control target SLPR-ID, control target CLPR-ID and other information. By the way, the "user" referred to here includes the whole storage administrator 53, the partition administrators 52A, 52B, and other administrators. In the user account control table 68G, a user account which can run and control one or more logical partition configurations, that is, which is authorized for operation, such as configuration changes of the SLPR 51 and the CLPR 50 set to the transfer-destination storage unit 110 in configuration control is held and controlled. Administrators such as partition administrators 52A, 52B who use the set user account are allowed for operations such as configuration control, change, and others within the scope of the logical partition actually run and controlled. For example, a user account which is authorized to operate all the SLPR 51 and the CLPR 50 in the transfer-destination storage unit 110 is set for the whole storage administrator 53. In addition, for example, for the administrators who have controlled the transfer-source storage unit 100A, a user account, which is authorized to operate the SLPR 51A and the CLPR 50A logical partitions as a partition administrator 52A in the transfer-destination storage unit 110, is set. In the same manner, independent from the SLPR 51A and the CLPR 50A, to the administrator who has been controlling the transfer-source storage unit 100B, a user account which is authorized to operate the SLPR 51B and the COPR 50B logical partitions as a partition administrator 52B in the transfer-destination storage unit 110 is set.

<Processing Flow>

Figure 15:
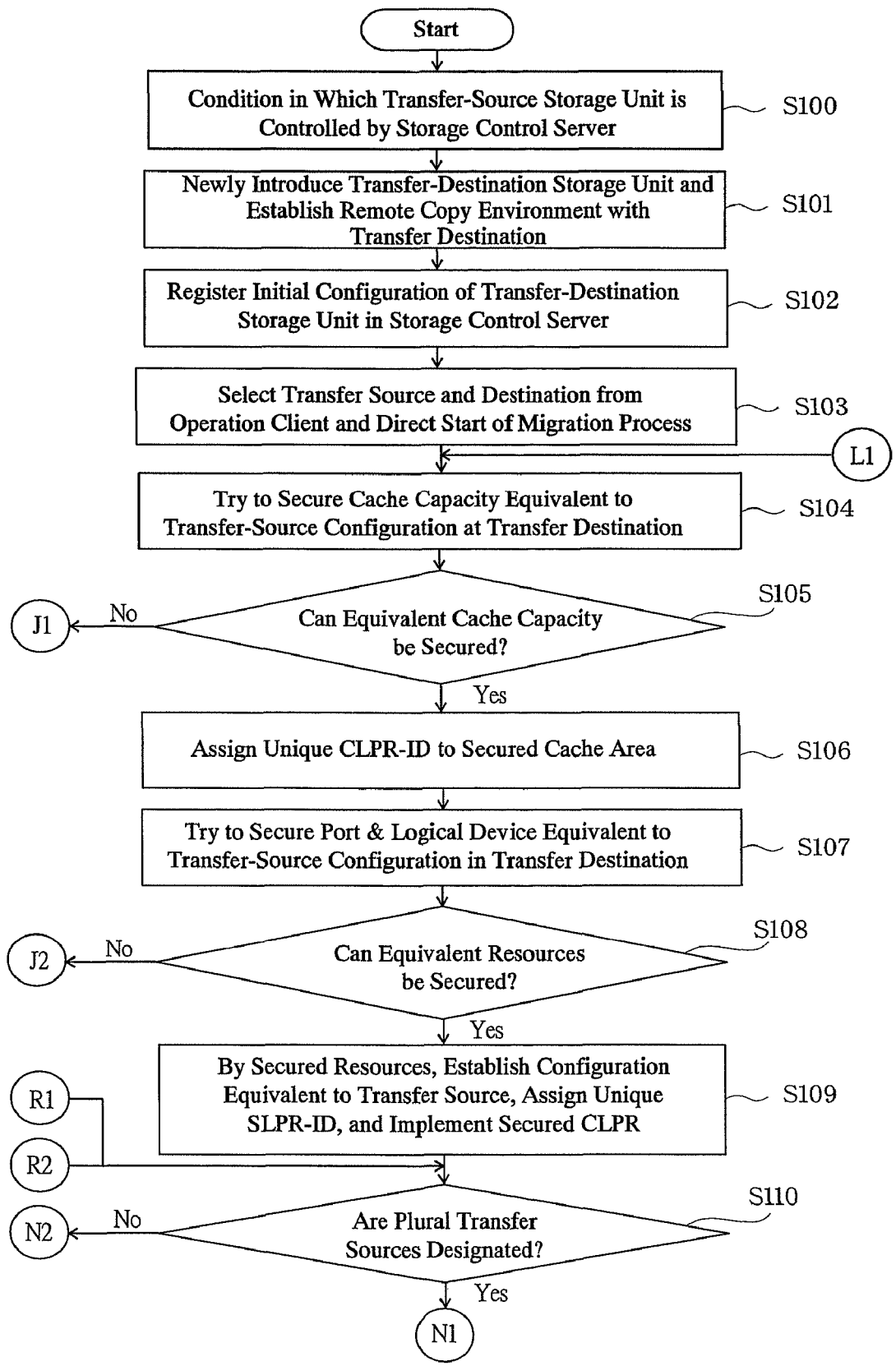
FIG. 15 is a flow chart (No. 1) of the whole processing in a storage system that is one embodiment of the present invention.
Figure 16:
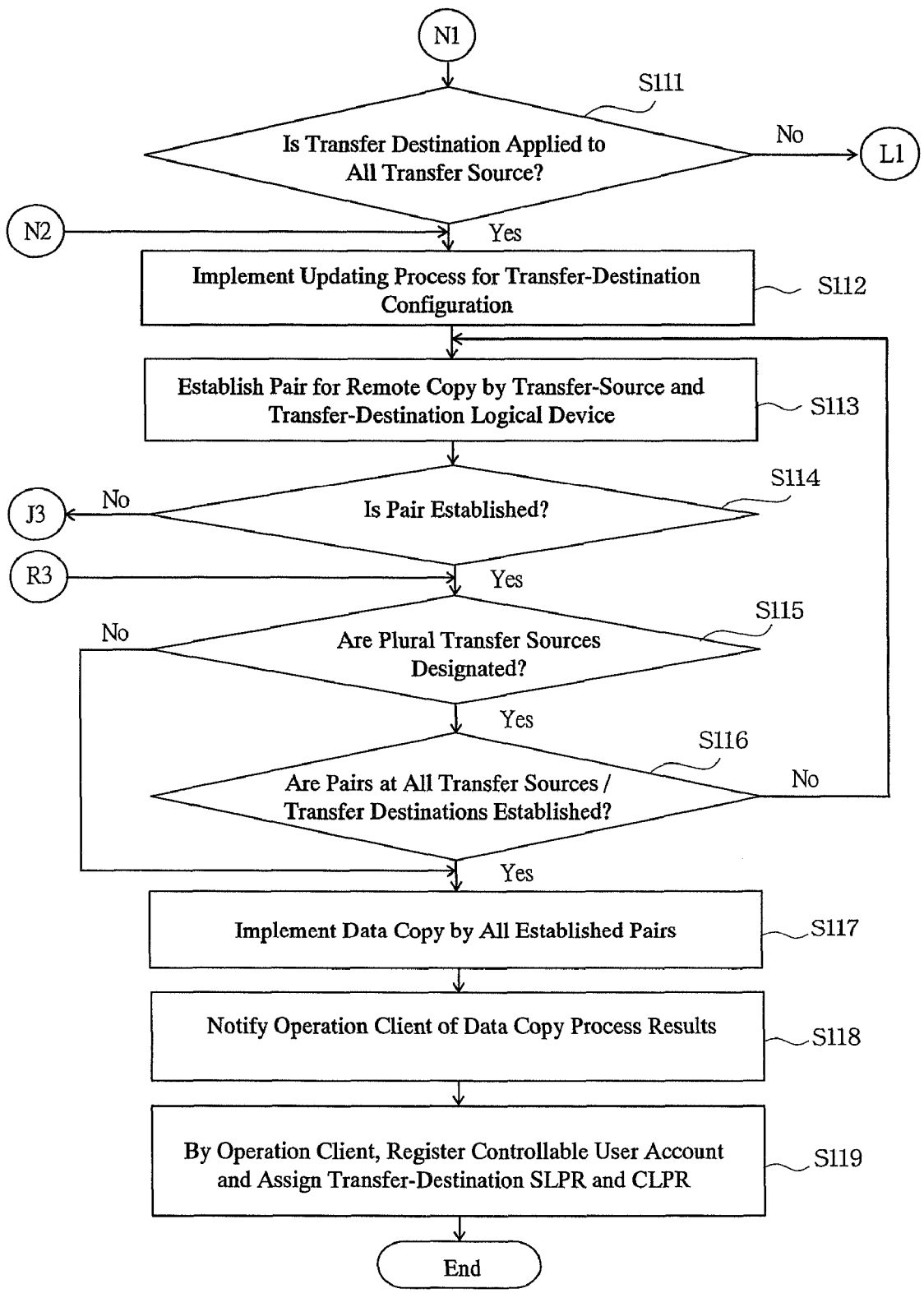
FIG. 16 is a flow chart (No. 2) of the whole processing in a storage system that is one embodiment of the present invention.
Figure 17:
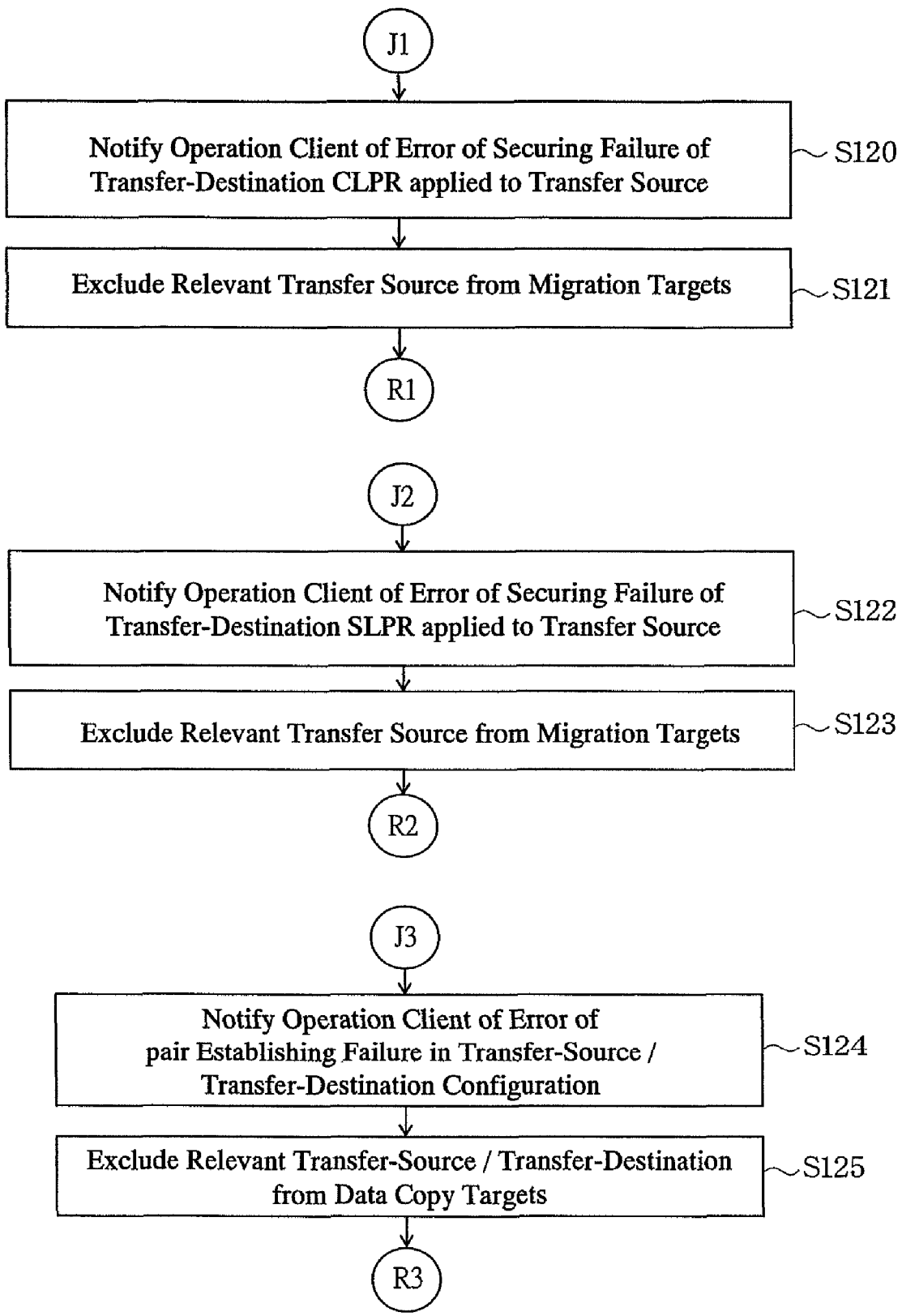
FIG. 17 is a flow chart (No. 3) of the whole processing in a storage system that is one embodiment of the present invention.

FIGS. 15 through 17 are flow charts which indicate the whole span of the processing and procedures which have been described with respect to the present embodiment. In FIG. 15, from processing start to processing S100, the transfer-source storage unit 100 is in the state in which the configuration is controlled by the storage control server 60. In S101, the transfer-destination storage unit 110 is newly introduced and a remote copy environment is established between the transfer-source storage unit 100 and the transfer-destination storage unit 110. In S102, the initial introduction configuration is registered to the storage control server 60 with the newly introduced transfer-destination storage unit 110 as a control target of the storage control server 60.

In S103, from the operation client 80, the transfer-source storage unit 100 and the transfer-destination storage unit 110 are chosen and migration processing start is directed to the storage control server 60. In such event, processing to acquire the latest configuration information 1 from each storage unit 10 by the storage control server 60 may be carried out.

In S104, as part of migration adequacy judgment, the storage control server 60 first tries to secure the cache capacity equivalent to the configuration of the transfer-source storage unit 100, that is, the designated capacity as CLPR50 by the transfer-destination storage unit 110 designated as the transfer-destination. In S105, whether or not the equivalent cache capacity is secured is judged. If it is secured (YES), in S106, a unique CLPR-ID is assigned to the secured cache area. And in S107, the storage control server 60 tries to secure the resources such as ports necessary for establishing the transfer-destination SLPR 51 and logical device. In S108, whether or not the equivalent resources are secured is judged. If it is secured (YES), in S109, established of the configuration equivalent to the transfer-source in the secured SLPR 51, assignment of the unique SLPR-ID to this, and assignment of the secured CLPR 50 are implemented.

In the S105, in the event that the CLPR 50 of the equivalent cache capacity cannot be secured due to shortage of the remaining assignable cache capacity in the transfer-destination storage unit or others (NO-J1), by S120, S121 of FIG. 17, the error information that indicates "failure of securing CLPR" is returned to the operation client 80 via the storage control server 60. And the relevant transfer-source storage unit 100 is excluded from the migration target for the CLPR 50 and the migration processing is not executed, and the processing moves to S110.

In the event that in the S108, the resources necessary for establishing the SDLPR 51 has been unable to be secured due to shortage of the available logical device 42 in the transfer-destination storage unit 110 (NO-J2), by S122, S123 of FIG. 17, the error information that indicates "failure of securing SLPR resources" is returned to the operation client 80 in the same manner. And the relevant transfer-source storage unit 100 is excluded from the migration target for the SLPR 51 and the migration processing is not executed, and the processing moves to S110.

Next, in S110, the storage control server 60 judges whether or not a plurality of the transfer-source storage units 100 are designated. If a plurality are designated (Yes-N1), the storage control server 60 confirms whether or not securing of the transfer destination applied to all the transfer sources has been carried out in S111 of FIG. 16, and if it is not secured (No-L1), the storage control server 60 repeats the processing procedures shown in S104 through S109 and S120 through S123.

After securing the transfer-destination applied to all the transfer sources (S111-Yes), in S112, updating of the configuration in the transfer-destination storage 110, that is, updating processing of configuration information 1 on shared memory 37 is actually carried out for the CLPR 50, the SLPR 51 for which resources necessary have been secured in the transfer-destination storage unit 110. By this, the transfer-destination CLPR 50 and SLPR 51 are generated on the logical configuration of the transfer-destination storage unit 110.

Successively, in S113, processing concerning data migration is started. In storage control server 60 and transfer-source and transfer-destination storage units 100, 110, for the transfer-source configuration whose migration to the logical partition in the transfer-destination storage unit 110 has been succeeded, establishment is tried for a copy pair for remote copy processing between the transfer-source and the transfer-destination logical devices 42.

In S114 through S116, whether or not the designated number of copy pairs corresponding to logical devices 42 of one or more transfer-source storage units 100 has been established is checked. In S114, whether or not a copy pair has been established in the transfer-source and the transfer-destination logical devices 42 is confirmed. In addition, in S115, whether or not multiple transfer sources are designated is confirmed. In addition, in S116, whether or not a copy pair at all the target transfer sources/transfer destinations have been established is confirmed. For those which were unable to establish a copy pair (S114-No-J3), in S124, S125 of FIG. 17, the error information that indicates "failure of establishing a copy pair corresponding to the transfer-source/transfer-destination configurations" is returned to the operation client 80. Then, the relevant transfer-source and transfer-destination storage units 100, 110 are excluded from the data copy processing targets and the data migration processing is decided not to be executed and processing is moved to the S115.

After establishing the copy-pair, in S117, data copy processing of the data of the logical device 42 from the transfer-source storage unit 100 to the transfer-destination storage unit 110 is actually carried out by the copy-pair control by the remote copy function. And in S118, the data copy processing results in all the copy-pairs are notified to the operation client 80 via the storage control server 60.

In S119, in the operation client 80, setting processing for the whole storage administrator to register the user account to which the authority to control the SLPR 51 and the CLPR 50 generated in the transfer-destination storage unit 110 is given and to assign for each logical partition is carried out for the storage control server 60. This concludes migration of configuration and data from the transfer-source to the transfer-destination <Migration Form>

Figure 18A:
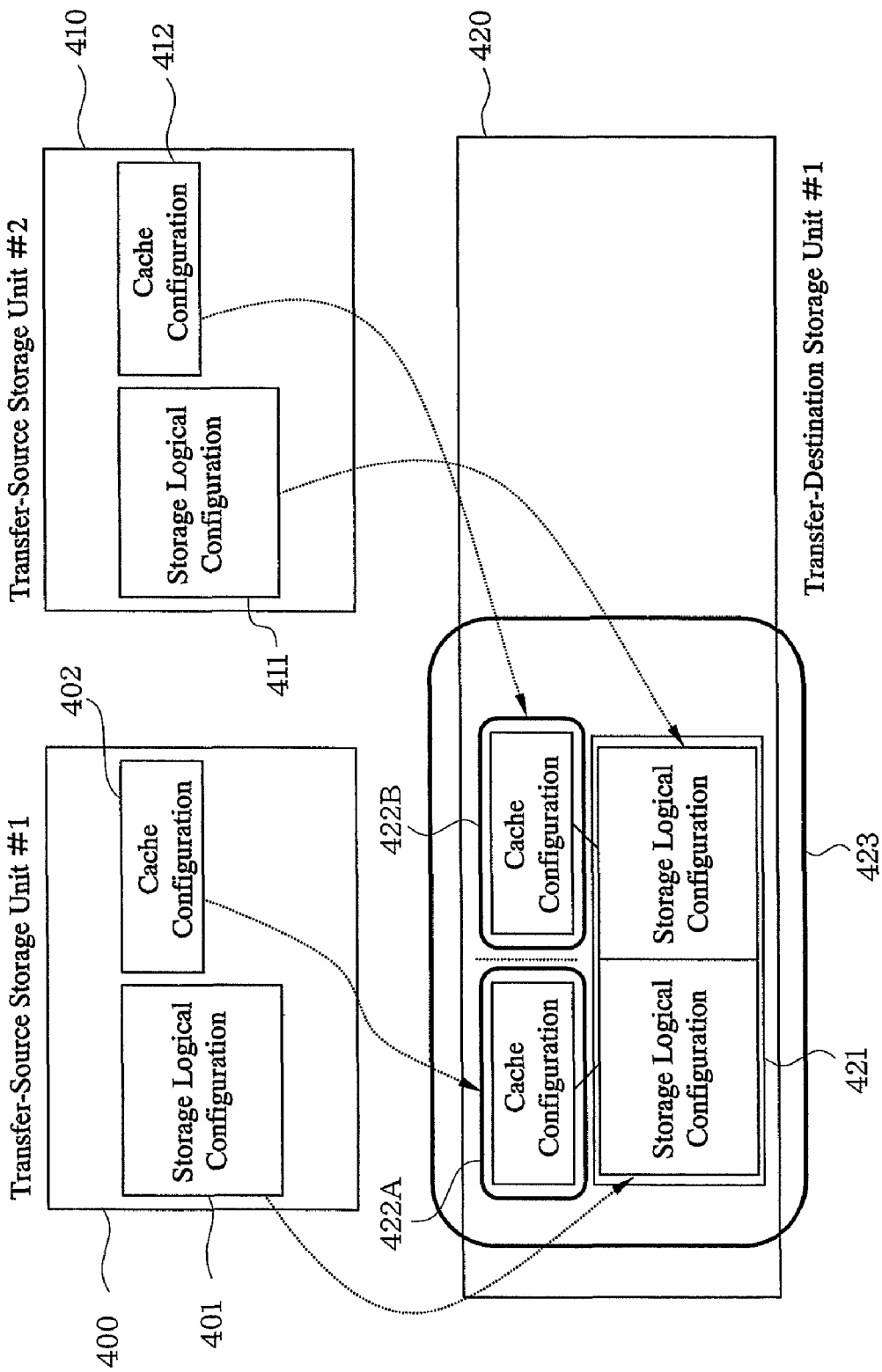
FIGS. 18A and 18B is an explanatory diagram for showing an example of consolidating a plurality of the transfer-source storage units into a logical partition region of one transfer-destination storage unit.
Figure 18B:
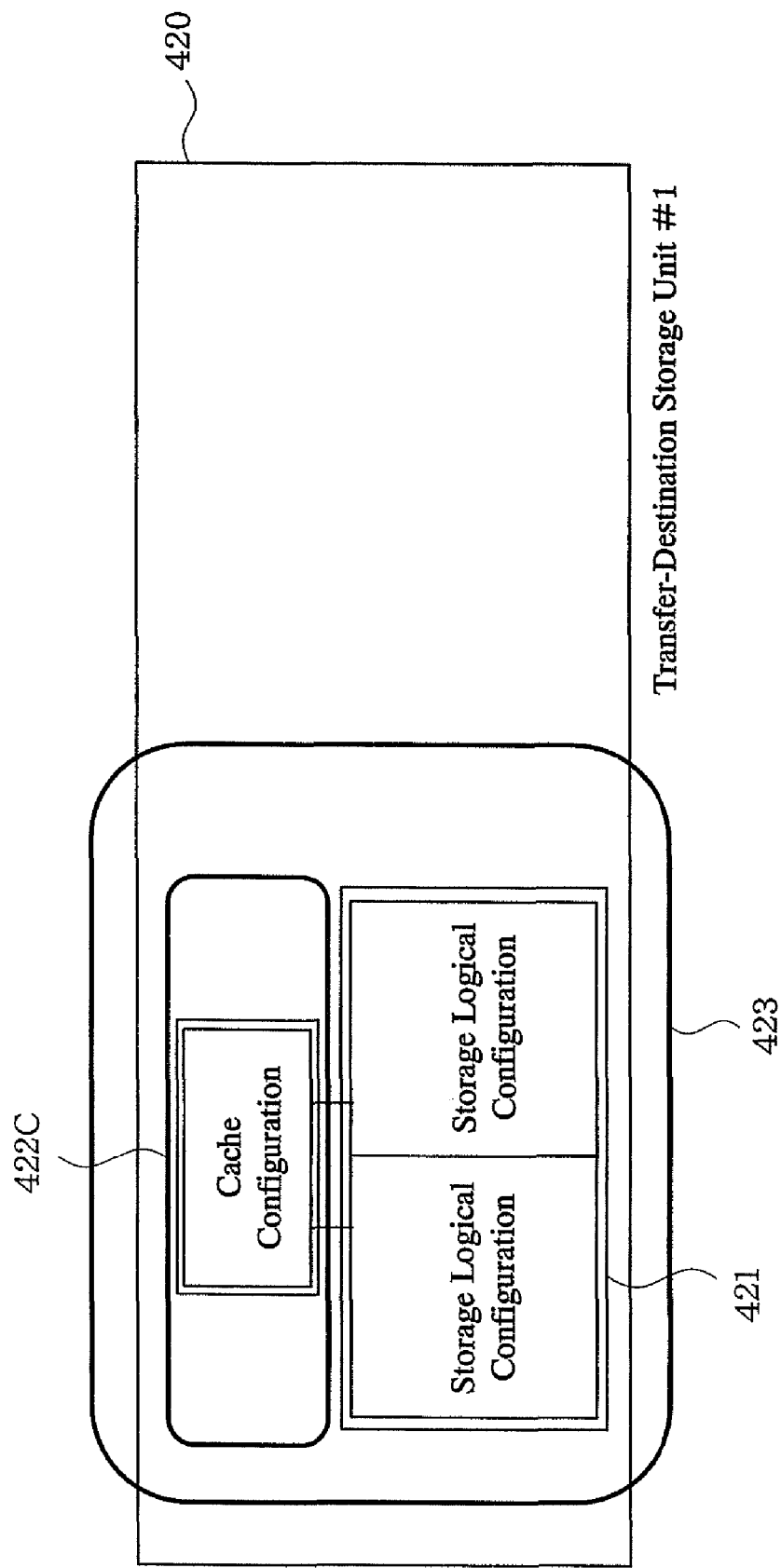

In FIGS. 18A and 18B, application examples in the migration form from the transfer-source to the transfer-destination logical partition configurations by the storage system in the present embodiment are shown. For example, assume that in the storage system, there are multiple transfer-source storage units #1 (400) and #2 (410) which do not have any logical partition function and there is one transfer-destination storage unit #1 (420) which has a logical partition function. The transfer-source storage unit #1 (400) has storage logical configuration 401 and cache configuration 402 as the configuration. The transfer-source storage unit #2 (410) has storage logical configuration 411 and cache configuration 412 as the configuration. The transfer-destination storage unit #1 (420) is able to configure the above-mentioned CLPR 50 and SLPR 51 as the logical partition function and CLPR 50 is assigned to the SLPR 51. The storage logical configurations 401, 411 are portions that correspond to conversion to the SLPR 51. The cache configurations 402, 412 are portions that correspond to conversion to the CLPR 50.

In the event that the configuration and data of two transfer-source storage units 400, 410 are migrated to the logical partition configuration of one of the transfer-destination storage units 420, in the CLPR 50 and SLPR 51 in the transfer-destination storage unit 420, there is no need to limit the transfer source and the transfer destination to the configuration in which the transfer source and the transfer destination are one-to-one associated as is the case of the example shown in FIG. 2. It is possible to consolidate multiple transfer-source storage units 100 into one transfer-destination storage unit 110 and handle them as one logical partition configuration from the viewpoint of control. Furthermore, when multiple transfer-source storage units 100 are migrated to the CLPR 50 and the SLPR 51 of the transfer-destination storage unit 110, the SLPR 51 only are consolidated and for the CLPR 50, the multiple CLPR 50's may be designated in accordance with the transfer-source configuration in the corresponding SLPR 51, respectively.

The example shown in FIG. 18A is a consolidation example when the storage logical configuration 401 and cache configuration 402 of the transfer-source storage unit #1 (400) and the storage logical configuration 411 and the cache configuration 412 of the "transfer-source storage unit #2(410) are migrated to the SLPR 51 and the CLPR 50 of the transfer-destination storage unit 420. In such event, with respect to the FLPR 51, the total of two transfer-source storage logical configurations 401, 411 as is the case of the consolidated storage logical configuration 421 are assigned as the SLPR 423. And with respect to the CLPR 50, two transfer-source cache configurations 402, 421 are assigned into one SLPR 423 as independent cache configurations 422A, 422B as it is. The advantage of this migration form is that because the configuration control can be centralized by using one SLPR 51 which is the basic for control of the logical partition at the transfer-destination but the cache access can occupy each CLPR 50 (422A, 422B) in the form to match the conventional transfer-source task system, the processing is free of detrimental effect such as access competition caused by processing on the other side when access is made to the cache memory 35 by processing on one side.

In addition, the consolidation as shown in FIG. 18B is possible, too. In this consolidation example, in the transfer-destination with respect to the SLPR 51, the storage logical configuration 421 consolidated in the same manner as in FIG. 18A is assigned as the SLPR 423. And with respect to the CLPR 50, two transfer-source cache configurations 402, 412 are assigned to one CLPR 422C as one consolidated cache configuration. In the CLPR 422C, the cache area of a capacity, for example, with transfer-source cache capacities added is secured. In the case of this migration form, the transfer-destination cache access becomes the shared access to one CLPR 422C.

Furthermore, if there exist a large number of storage units 10 to be replaced, it is possible to designate, from the operation client 80 and others, a plurality of migration forms such as assigning 1-to-1 the transfer-source configuration and the transfer-destination logical partition configuration in one or more transfer-destination storage units 110 for multiple transfer-source storage units 100 or to consolidate multiple transfer-source configurations into a specific logical partition as described above and to execute migration in a lump. There is no case in which particularly only one transfer-destination storage unit 110 is allowed to be designated. In addition, it is possible to designate the type, etc. of the migration form from the operation client 80 and others and execute migration, etc. in the mode in which the type of each migration form or processing mode as described above is prepared in a system in advance, or a mode in which a administrator is allowed to register the setting related to migration form.

EFFECTS AND MODIFIED EXAMPLES

As described above, in the migration system of the present embodiment, in carrying out migration of the configuration and data from one storage unit 10 to other storage unit 10, for example, migration for replace and others, migration to the storage unit (110) which has a logical partition function from the storage unit (100) which has no logical partition function can be efficiently achieved, and burdens of personal work by the person in charge such as rereading of the configuration information 1 and others can be reduced. In the present embodiment, the configuration and the data can be continuously migrated in a lump, in particular, with the configuration of no logical partition of the transfer-source storage unit 100 and the stored data of the storage volume set as a logical partition configuration of a system of the SLPR 51 and the CLPR 50 and others of the transfer-destination storage unit and the stored data in the logical partition.

In addition, in the present embodiment, it is possible to migrate the configuration only, that is, the configuration information 1 only, in addition to the migration processing of the configuration and the data described above. For example, in accordance with the procedure as shown in FIG. 8, processing and operation up to establishment of the logical partition configuration of the transfer-destination storage unit 110 of S10 are carried out. And with respect to the stored data of the storage volume of the transfer-source storage unit 100, directions are given newly later and migration processing can be implemented.

In addition, with respect to the operation of remote copy environment creation for data migration, it may carry out processing to display directions for each necessary work procedure such as direction to set a communication route to the operation client 80 through the storage control server 60 when the state required for data migration is reached. The person in charge is allowed to carry out the work in accordance with the direction and after securing the condition in which the data can be migrated, the data migration processing is started.

In addition, the migration work can be carried out in either operation or non-operation state of the transfer-source storage unit 100. That is, it is possible to execute migration processing while online task processing by the task server 130 is in session after a data I/O access is received from the task server 130 by the transfer-source storage unit 100 and needless to say, it is possible to execute migration processing with the online task processing temporarily suspended.

And, as a migration form of the configuration and the data, it is also possible to copy the configuration of one storage unit (100) to the other storage unit (110), in addition to the mode to replace, that is, to move the configuration of the old storage unit (100) to the new storage unit (110) and change over the use. It is also possible to continue or stop the use of the transfer-source storage unit (100) after migration.

In addition, in the present embodiment, for the case in which the constructions of the transfer-source and the transfer-destination configuration information 1 differ, the case in which there is a difference in presence or absence of the logical partition function was described, migration is possible under the conditions in which the construction of the configuration information 1 can be converted by the conversion processing at the storage control server 60 for other functions related to the logical partition function and others.

In the event the transfer-destination storage unit 110 has a logical partition function, it is not always necessary to convert the transfer-source logical partition configuration to the transfer-destination logical partition configuration but is possible to copy the configuration with no logical partition as it is from the transfer-source to the transfer-destination is possible in accordance with the directions and others from the operation client 80. In addition, it is also possible to migrate one transfer-source storage unit 100 only.

In addition, the storage control server 60 is equipped with both the configuration control means to carry out the control of the configuration information 1 of multiple storage units 10 and the configuration conversion means to carry out conversion processing for migration, but a mode to divide and provide two functions on different units may be acceptable.

In addition, a mode to possess the configuration information 1 in the storage unit 10 only, hold no configuration information 1 in the storage control server 60, and carry out migration control only including the conversion processing is possible, too. In such event, the storage control server 60 does not carry out batch control of each configuration information 1 but as the migration control, the configuration information 1 is read from both transfer-source and transfer-destination storage units 100, 110 when migration is executed and conversion processing of the configuration information 1 is carried out by 68C for the migration configuration conversion program, and the setting update information prepared by the conversion is transmitted to the transfer-destination storage unit 110 and the configuration is updated.

In addition, as another embodiment of the present invention, the following modes are possible as the mode in which the storage control server 60 is not used. In the typical embodiment mentioned above, processing information such as configuration information 1 and others is transmitted and received between units through the communication means such as network 300 and others, but a mode in which the portion of the processing information transmission and reception processing is not carried out on the communication means may be adopted. That is, in the mode in which the communication means is not used, migration work is carried out by the administrator while the processing information is stored in the recording medium and physically moved from one unit to the other. The configuration conversion means which the storage control server 60 is equipped with, that is, the conversion program equipped with the function same as that of the migration configuration conversion program 68C is used.

The person in charge such as the whole storage administrator 53 reads the configuration information 1 on shared memory 37 from the transfer-source storage unit 100 temporarily to an external recording medium through the SVP 38 processing and others and stores. The recording medium includes a flexible disk, CD, and others. And the person in charge moves from one unit to the other, executes the conversion program on certain information processor unit such as the transfer-destination PC and others, loads the processed information such as configuration information 1 and others stored in the recording medium, and carries out conversion processing and others for the migration by the conversion program. Then, the person in charge stores the processed information after conversion processing, that is, the setting update information and others in a recording medium again and moves to the transfer-destination storage unit 110. And the person in charge loads the processed information from the recording medium in processing of the transfer-destination storage unit 110 through processing of the SVP 38 and others, and reflects the setting update information read by the SVP 38 to the configuration information 1 on shared memory 37 and updates the configuration. By this kind of operation, migration is possible without carrying out transmission and reception of the information on the communication means.

In the foregoing description, the invention made by the present inventors has been specifically described based on the embodiment. However, needless to say, the present invention is not limited to the above embodiment and can be variously modified and altered without departing from the gist thereof.

The present invention is applicable as a computer system that carries out processing and operation of migrating the configuration and data of a storage unit.

What is claimed is:

1. A storage system including a plurality of storage units each equipped with a storage device and a controller for controlling storage of data into said storage device, the storage system comprising:

said storage units each having a configuration of which configuration information including logical configuration information is held on a memory; and a migration control unit for controlling configuration migration between a first storage unit having no logical partition function and a second storage unit having said logical partition function, wherein said migration control unit carries out processing for configuration migration, in accordance with a direction of migration, by performing a conversion process in which a configuration of said first storage unit to be a transfer-source is converted to a logical partition configuration of said second storage unit to be a transfer destination, based on the configuration information of said first storage unit, thereby updating a configuration of said second storage unit; and wherein said logical partition function divides a storage device into a plurality of logical groups each having resources including a port, a cache memory, and a logical device so as to allow an administrator to change a configuration of the port, the cache memory, or the logical device in the logical group assigned to said administrator but not to change a configuration of the port, the cache memory, or the logical device in the logical group not assigned to said administrator.

2. A server unit for controlling configuration migration between a plurality of storage units of a storage system each equipped with a storage device and a controller for controlling storage of data into said storage device, comprising:

at least two of said storage units each having a configuration of which configuration information including logical configuration information is held on a memory, a first one of said at least two storage units having no logical partition function and being set as a transfer source while a second one of said at least two storage units having said logical partition function and being set as a transfer destination, said first storage unit and said second storage unit being communicably connected to each other, wherein said server unit is formed to collect and hold the configuration information of each of said storage units in a table to convert a configuration of said first storage unit to a logical partition configuration of said second storage unit, based on the configuration information in said table in accordance with a direction of migration, and to transmit information prepared by the conversion process to said second storage unit, thereby updating a configuration of the second storage unit.

3. The server unit according to claim 2, wherein each of said storage unit, has a configuration in which a processor unit, which enables an input/output to/from the configuration information held on said memory and is communicably connected to the outside, is connected, and said server unit acquires the configuration information from each of said first and second storage units through a process by said processor unit, and updates the configuration information held by said second storage unit.

4. The server unit according to claim 2, wherein said configuration information of each of said storage units includes, logical configuration information on logical configuration including a path configuration, a storage volume configuration, and a cache configuration, and is held on the memory, said second storage unit is able to configure, by said logical partition function, a first logical partition of said cache configuration and a second logical partition of other configurations including said path configuration and said storage volume configuration, and said server unit converts, in accordance with the direction of migration, said cache configuration of said first storage unit to said first logical partition, and other configurations including said path configuration and said storage volume configuration of said first storage unit to said second logical partition, as the logical partition configuration of said second storage unit.

5. The server unit according to claim 2, wherein said server unit receives a direction of a process related to said migration from other storage units, receives, by said direction, designation of said first storage unit to be the transfer source and said second storage unit to be the transfer destination, and controls the migration designated from the transfer source to the transfer destination.

6. The server unit according to claim 2, wherein said server unit reads the configuration information of said first storage unit and the configuration information of said second storage unit held in said table, carries out the converting process therebetween, reflects the information prepared by said converting process, to the configuration information of said second storage unit held in said table and updates said table, and transmits the information prepared by said converting process to said second storage unit and updates the configuration information of said second storage unit by the information.

7. The server unit according to claim 2, wherein said stored data is migrated by remote-copying the stored data of the storage volume of said first storage unit to said second storage unit.

8. The server unit according to claim 2, wherein said server unit carries out a migration process by converting one-to-one a plurality of transfer-source storage-unit configurations to a plurality of logical partition configurations in a transfer-destination storage unit.

9. The server unit according to claim 2, wherein said server unit carries out a migration process by consolidating a plurality of transfer-source storage unit configurations to one logical partition configuration in a transfer-destination storage unit.

10. The server unit according to claim 2, wherein said server unit assigns transfer-destination logical configuration resources to the transfer source in such a manner that a configuration as equivalent to the configuration of said first storage unit is secured as a logical partition configuration of said second storage unit in said converting process.

11. A method for controlling configuration migration between a plurality of storage units of a storage system each equipped with a storage device and a controller for controlling storage of data into said storage device, and each having a configuration of which configuration information including logical configuration information is held on a memory comprising:

configuring a first one of the storage units without logical partition function and a second one of the storage units with said logical partition function; setting said first storage unit as a transfer source and said second storage unit as a transfer destination communicatably connecting said first and second storage units to each other;

collecting and holding the configuration information of each of said storage units in a table;

converting a configuration of said first storage unit to a logical partition configuration of said second storage unit, based on the configuration information in said table in accordance with a direction of migration; and transmitting information prepared by the conversion process to said second storage unit, thereby updating a configuration of the second storage unit, wherein said logical partition function divides a storage device into a plurality of logical groups each having resources including a port, a cache memory, and a logical device so as to allow an administrator to change a configuration of the port, the cache memory, or the logical device in the logical group assigned to said administrator but not to change a configuration of the port, the cache memory, or the logical device in the logical group not assigned to said administrator.

12. A software program embedded in a non-transitory computer readable medium for controlling configuration migration between a plurality of storage units of a storage system each equipped with a storage device and a controller for controlling storage of data into said storage device, and each having a configuration of which configuration information including logical configuration information is held on a memory, comprising:

a module for configuring a first one of the storage units without logical partition function and a second one of the storage units with said logical partition function;

a module for setting said first storage unit as a transfer source and said second storage unit as a transfer destination a module for communicatably connecting said first and second storage units to each other;

a module for collecting and holding the configuration information of each of said storage units in a table;

a module for converting a configuration of said first storage unit to a logical partition configuration of said second storage unit, based on the configuration information in said table in accordance with a direction of migration; and a module for transmitting information prepared by the conversion process to said second storage unit, thereby updating a configuration of the second storage unit, wherein said logical partition function divides a storage device into a plurality of logical groups each having resources including a port, a cache memory, and a logical device so as to allow an administrator to change a configuration of the port, the cache memory, or the logical device in the logical group assigned to said administrator but not to change a configuration of the port, the cache memory, or the logical device in the logical group not assigned to said administrator.

* * * * *